(12) United States Patent
Fujisawa et al.

(10) Patent No.: US 6,829,111 B2
(45) Date of Patent: Dec. 7, 2004

(54) PROJECTION LENS MANUFACTURING APPARATUS, PROJECTION LENS MANUFACTURING METHOD, PROJECTION LENS MANUFACTURED BY THE PROJECTION LENS MANUFACTURING METHOD AND PROJECTOR HAVING THE PROJECTION LENS

(75) Inventors: Shohei Fujisawa, Matsumoto (JP); Hirotatsu Okubo, Nagano (JP); Shunji Umemura, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/464,521

(22) Filed: Jun. 19, 2003

(65) Prior Publication Data

US 2004/0061947 A1  Apr. 1, 2004

(30) Foreign Application Priority Data

Jun. 19, 2002 (JP) .................................... 2002-178637

(51) Int. Cl.⁷ ............................................... G02B 7/02
(52) U.S. Cl. ........................................ 359/822; 359/819
(58) Field of Search ............................... 359/822, 819, 359/800

(56) References Cited

U.S. PATENT DOCUMENTS 6,262,853 B1    7/2001  Takanashi et al. .......... 359/703
6,392,819 B1    5/2002  Harada ........................ 359/719
2002/0027725 A1 3/2002  Schletterer .................. 359/811

FOREIGN PATENT DOCUMENTS

| JP | A-62-199281 | 9/1987 |
| JP | A 08-334664 | 12/1996 |
| JP | A-11-174301 | 7/1999 |
| JP | A-2000-206388 | 7/2000 |
| JP | A-2000-352650 | 12/2000 |
| JP | A-2001-56426 | 2/2001 |
| JP | A-2001-66485 | 3/2001 |
| JP | A-2001-100071 | 4/2001 |
| JP | A-2002-62463 | 2/2002 |
| JP | A 2002-040308 | 2/2002 |
| JP | A-2002-98875 | 4/2002 |
| JP | A 2002-189159 | 7/2002 |

*Primary Examiner*—David N. Spector
(74) *Attorney, Agent, or Firm*—Oliff & Berridge, PLC

(57) ABSTRACT

A projection lens has a lens barrel in which group lenses are sequentially disposed and an optical path is set, the lens barrel having position-adjusting holes on a position orthogonal to an optical axis of a third group lens and being orthogonal with each other. The projection lens manufacturing apparatus has a projection lens holding mechanism for holding the projection lens at the lens-adjusting position; an image light irradiating mechanism which introduces the test pattern image in accordance with a light beam irradiated by a light source onto the projection lens; a lens position adjuster which adjusts the position of the third group lens along X-axis and Y-axis while detecting the image light irradiated through the projection lens; and a bonding mechanism for bonding the adjusted third group lens.

15 Claims, 21 Drawing Sheets

PROJECTION LENS MANUFACTURING APPARATUS, PROJECTION LENS MANUFACTURING METHOD, PROJECTION LENS MANUFACTURED BY THE PROJECTION LENS MANUFACTURING METHOD AND PROJECTOR HAVING THE PROJECTION LENS

BACKGROUND OF THE INVENTION

1. Field of Invention

The present invention relates to a projection lens manufacturing apparatus, a projection lens manufacturing method, a projection lens manufactured by the projection lens manufacturing method and a projector having the projection lens.

2. Description of Related Art

A related art projector having a plurality of liquid crystal panels for respectively modulating a plurality of color lights in accordance with image information, a cross dichroic prism for combining the color lights modulated by the respective liquid crystal panels, and a projection lens for projecting the light beam combined by the prism in an enlarged manner to form a projection image has been used.

As a projection lens used for such a projector, a compound lens composed of a combination of a plurality of lenses including a converging lens and a diverging lens is used in order to minimize deterioration in resolution and spherical and color aberration. However, in order to have the lenses function correctly and obtain a high-quality projected image, the position of the optical axis (core) of respective lenses of the projection lens should be adjusted with high accuracy.

In the related art, after accurately processing the profile of the plurality of lenses and a lens-holding barrel that holds the lenses, a trial-and-error process was conducted for producing a high-quality projection lens, where a part of the components is exchanged until the optical axis is aligned by observing the projected image. However, since the variation of profile accuracy of the components dominates over the accuracy of optical axis alignment in such arrangement, the optical axis cannot be accurately adjusted and troublesome work is necessary for the trial-and-error production process.

Accordingly, an arrangement for a projection lens has been proposed, where holes for adjusting the lens position are provided on a lens-holding barrel on three locations at a regular interval on a plane orthogonal with the illuminating optical axis of the optical path formed inside the lens-holding barrel and a pin-member such as a screw directed from the outside to the center of the barrel is attached to the three position-adjusting holes. In such projection lens, the three pins are advanced and retracted to bias the lens to be adjusted so that the position of the lens is adjusted within the plane orthogonal with the illuminating optical axis.

Another arrangement has been proposed where the lens to be adjusted is clamped at a predetermined position and the lens-holding barrel accommodating the lens is moved to adjust the position of the lens. See Japanese Patent Laid-Open Publication No. Hei 8-334664.

Still another arrangement has been proposed where the lens is fixed by caulking inside the lens-holding barrel provided with a distortion absorber and, subsequently, the lens position is adjusted by moving the lens. See Japanese Patent Laid-Open Publication No. 2002-189159. The distortion generated by adjusting the lens is absorbed by the distortion absorber, whish is removed by beating.

In a further alternative related art arrangement, a lens-holding barrel for holding the lens is constructed of a first lens-holding barrel and a second lens-holding barrel provided on the outside of the first lens-holding barrel, and a lens-holding spring is disposed between the first lens-holding barrel and the second lens-holding barrel. The lens-holding spring is compressed by a screw provided on the second lens-holding barrel to adjust the first lens-holding barrel by moving in a direction orthogonal to the optical axis. See Japanese Patent Laid-Open Publication No. 2002-40308. In this arrangement, a holding ring is provided on the front end of the first lens-holding barrel and the first lens-holding barrel is sandwiched and fixed between the holding ring and the second lens-holding barrel.

However, in the related art method for adjusting the lens position where a pin is provided on the projection lens as a product itself, large number of components are required for constructing the projection lens, which results in high production cost and increase in size and weight of the projection lens.

In the related art arrangement where the in-plane position of the lens is adjusted to have directions, when one of the pins are advanced or retracted, the other two pins also have to be advanced or retracted, which makes it difficult to know how far the two pins have to be moved, in other words, to recognize the relationship between the advancement and retraction of the pins and the direction for the lens to be moved, thereby requiring complicated work for adjusting the optical axis. At this time, since the respective pins advance and retract in different directions, the opening area of the position-adjusting hole has to be set wide to some extent in accordance with the lens to be adjusted, which can result in deterioration in the quality of the projected image on account of light leakage through the opening.

According to the method disclosed in JP-8-334664, since a lens fixed to the lens-holding barrel is moved in accordance with the movement of the lens-holding barrel, the center of the fixed lens relative to adjustment light source is shifted. Accordingly, it can be difficult to align the optical axis of the fixed lens with the optical axis of the lens to be adjusted, thus being unable to adjust the optical axis position of the lens with high accuracy.

According to the method disclosed in JP-2002-189159, since the distortion absorber has to be provided on the lens-holding barrel, the size of the lens-holding barrel and, as a result, the projection lens having the lens-holding barrel is increased. Further, since the distortion generated on the distortion absorber is removed by heating, the lens cannot be made of plastics with low-heat resistance. Further, since the lens position fixed on the lens-holding barrel is adjusted against the holding force of the lens-holding barrel, fine-adjustment, i.e. adjusting the lens position with high-accuracy may become difficult.

According to the method disclosed in JP-2002-40308, since a position adjusting mechanism composed of lens-holding spring and screw is provided on the projection lens, the number of components of the projection lens is increased and the structure of the projection lens becomes complicated. Further, in order to provide such position-adjusting mechanism having such lens-holding spring and screw on the projection lens, the projection lens must be provided with two lens-holding barrels, i.e. the first lens-holding barrel and the second lens-holding barrel, which requires a holding ring provided on the front side of the first lens-holding barrel for fixing the first lens-holding barrel to the second lens-holding barrel, so that the size of the projection lens is increased in the optical axis direction.

SUMMARY OF THE INVENTION

The present invention provides a projection lens manufacturing apparatus and a projection lens manufacturing method capable of reducing the number of components to enable reduction in cost, size and weight of a projection lens, of easily adjusting the position of optical axis of a plurality of lens of the projection lens with high accuracy to obtain a high-quality image projection, and of easily manufacturing a projection lens without limiting the material to be used for the lens, a projection lens manufactured by the projection lens manufacturing method, and a projector having the projection lens.

A projection lens manufacturing apparatus according to an aspect of the present invention is for manufacturing a projection lens including a lens-holding barrel with a predetermined optical path being set inside thereof and a plurality of lenses sequentially arranged on an illuminating optical axis of the optical path, a pair of position-adjusting holes formed respectively on two axes orthogonal to each other to adjust the position of at least one of the plurality of lenses on a plane orthogonal to the illuminating optical axis along the two axes, the apparatus having: a light source that irradiates an adjustment light beam; a projection lens holding mechanism that holds a lens to be manufactured at a lens-holding position for adjusting the position of the lens to be adjusted on the illuminating optical axis; an image light irradiation mechanism that forms an image light including a predetermined test pattern in accordance with the light beam irradiated by the light source and introduces the image light into the projection lens located at the lens-adjusting position; two lens position adjusters that respectively adjust the position of the lens to be adjusted along the two axes through the lens position-adjusting holes while detecting the image light projected by the projection lens into which the image light is introduced; and a bonding mechanism that bonds the position-adjusted lens to the lens-holding barrel.

The plurality of lenses include at least two groups of lenses, and the number of the groups, and the shape, the size and the function of the lens are not restricted. The lens to be adjusted is one or more lenses to be adjusted, where a lens that most influences on the quality of projected image is selected as the lens to be adjusted. The number of the lens position adjuster may be set in any manner according to the number of the lens to be adjusted.

The lens-holding barrel of the projection lens to be manufactured may have a collar to be attached to an end of an optical system of the projector in which the projection lens is installed.

In the above arrangement, the projection lens holding mechanism may include a plate-shaped lens holding member having a circular opening at the center thereof. Namely, the projection lens holding mechanism may hold the projection lens by inserting the lens-holding barrel into the circular opening with the collar being disposed on the outer circumference of the circular opening.

In the cylindrical lens-holding barrel of the projection lens, the position-adjusting holes, for instance, may be formed on X-axis and Y-axis being orthogonal to each other and also orthogonal to the illuminating optical axis of the optical path formed by the plurality of the lenses housed therein. Specifically, total four position-adjusting holes may be formed, two of position-adjusting holes being formed on the X-axis in an opposing manner and the other two position-adjusting holes being formed on the Y-axis in an opposing manner. More specifically, the position-adjusting holes may be formed on upper, lower, left and right sides of the lens-holding barrel when the lens-holding barrel is seen from the projection side. The orthogonal two axes may not cross the illuminating optical axis.

The position adjuster may adjust the lens position by advancing and retracting the pins inserted into the pair of position-adjusting holes formed on the lens-holding barrel. For instance, the position adjuster may have mutually opposing pins being inserted to a pair of position-adjusting holes and the lens to be adjusted may be held by the tip of the pins, where advancement and retraction of one of the pins causes retraction and advancement of the other pin while the pins are in contact with the outer circumference of the lens. Incidentally, such advancement and retraction of the pins may be conducted by automatic control by a computer and the like or by manual operation by a worker.

Further, in order to detect the image light, the image light projected from the projection lens on the screen may be checked by the naked eye or may be detected by an image pickup device such as a CCD camera provided on the backside of the screen to be image-processed. Incidentally, the image light projected by a projection lens may be directly detected by an image pickup device without projecting the image light on a screen.

The predetermined test pattern may include a pattern in which light-shielding areas are vertically or horizontally arranged in stripes at regular interval. The test pattern may be provided for respective three colors of RGB (Red, Green and Blue).

According to the present invention, the projection lens may be manufactured with the following steps.

(1) Initially, the position-adjusting holes are formed on the cylindrical lens-holding barrel of the projection lens at a position on X-axis and Y-axis being orthogonal to each other and also orthogonal to the illumination optical axis of the optical path formed by the plurality of lenses housed therein. Namely, four position-adjusting holes, i.e. two opposing position-adjusting holes formed on the X-axis and two opposing position-adjusting holes formed on the Y-axis are formed on the lens-holding barrel.

(2) A pre-adjusted projection lens is prepared, where the lens to be adjusted is arranged in a loosely-fitted manner and other lenses are disposed and bonded with reference to the profile thereof in the lens-holding barrel.

(3) The pre-adjusted projection lens is held at the lens-adjusting position by the projection lens holding mechanism (Projection Lens Holding Step). The pins of the lens position adjuster are inserted into the respective position-adjusting holes to hold the outer circumference of the lens to be adjusted by the tips of pins at four points.

(4) In the above-described conditions, an adjustment light beam is irradiated by the light source (Light Beam Irradiation Step), so that the image light including the predetermined test pattern is irradiated onto the pre-adjusted projection lens by the image light irradiation mechanism in accordance with the adjustment light beam (Image Light Irradiation Step) and is projected on a screen etc. in an enlarged manner.

(5) While the projected image on the screen is observed, the position of the lens to be adjusted in X-direction is adjusted by the lens position adjuster on the side of X-axis (Lens Position Adjustment Step). Specifically, tips of a pair of pins inserted into the pair of position-adjusting holes on the X-axis are brought into contact with the outer circumference of the lens, where advancement of one of the pair of pins causes retraction of the other pin and retraction of the one of the pins advances the other. With such an arrangement, the lens position is manually adjusted in X-direction by advancing and retracting the pair of pins. In the same manner, the position of the lens in Y-direction is manually adjusted by the lens position adjuster on the side of Y-axis. Accordingly, the position of the optical axis between the plurality of the lenses can be accurately adjusted.

During the optical axis adjustment work, the lens position is adjusted so as to minimize the flare etc. and sharpen the image of the predetermined test pattern while observing the quality of the projected image.

(6) The lens of which position is adjusted is bonded to the lens-holding barrel by an adhesive (Bonding Step).

(7) Finally, the projection lens is moved from the lens holding position and removed from the projection lens manufacturing apparatus to complete the manufacturing process of the projection lens. By repeating the process, the projection lens can be continuously manufactured.

According to the present invention, since the above-described manufacturing steps are applied to manufacture a projection lens, the position of one of the lenses of the projection lens can be independently adjusted with high accuracy in the X-direction and the Y-direction orthogonal to each other. Therefore, the direction to be adjusted can be easily recognized as compared to a conventional arrangement where the lens is adjusted by pins in three directions. Since only two lens position adjusters corresponding to the respective axes directions are required, the adjustment work of the optical axis position can be facilitated. In the above arrangement, since a pair of position-adjusting holes are respectively provided along the respective axes and the lens position adjusting mechanism are inserted into the pair of the position-adjusting holes to be linearly advanced and retracted, so that it is not necessary to enlarge the size of the opening of the position-adjusting holes as in a conventional arrangement, thereby providing a projection lens capable of preventing light leakage and projecting an appropriate image.

Since the lens position adjuster is provided on the side of the projection lens manufacturing apparatus instead of the side of projection lens, the number of components of the projection lens can be reduced, thereby reducing manufacturing cost, size and weight of the projection lens.

In the manufacturing apparatus according to the present invention, since the lens itself is moved instead of the lens-holding barrel, the optical axes of other lenses fixed to the lens-holding barrel (if present) are not shifted relative to the adjustment light source. Therefore, the axes of the other lenses and the lens to be adjusted can be easily aligned, thereby adjusting the position of the optical axis with high accuracy.

In the manufacturing apparatus according to the present invention, since the position of the lens to be adjusted is adjusted before the lens is bonded to the lens-holding barrel, the lens-holding barrel is not distorted by adjusting the position of the lens. Therefore, since there is no need to provide a distortion absorber on the lens-holding barrel, the size of a lens holding frame and the projection lens can be reduced. Further, since the lens-holding barrel is not distorted, there is no need to heat the lens-holding barrel for removing the distortion. Accordingly, a heat-sensitive material may be used for the lenses, so that the lens material is not limited. Additionally, since the position of the lens is adjusted before being bonded to the lens-holding barrel, the position of the lens can be finely adjusted with ease and with high accuracy.

In the above-described projection lens manufacturing apparatus, the lens position adjuster preferably has: first and a second pins that are respectively inserted into the pair of the position-adjusting holes and abut to the outer circumference of the lens to be adjusted; a biasing portion that biases the first and the second pins toward each other; and an advancement/retraction portion that advances and retracts the first pin relative to the second pin, the advancement and retraction of the first pin causing retraction and advancement of the second pin.

According to the above arrangement, the pins are respectively inserted into the position-adjusting holes facing each other on a predetermined axis, and the pins are biased by the biasing portion toward each other to hold the lens. Then, the advancement/retraction portion is operated to advance and retract the first pin, so that the position of the lens can be adjusted with ease while holding the lens with the two pins. Further, the position of the lens can be adjusted on the other axis in the same manner.

The biasing portion is preferably a cylinder device provided for each of the pin that biases the pins by fluid pressure.

According to the above arrangement, the pins can be always positioned at a regular position by maintaining the pressure of the fluid such as air and oil inside the cylinder device at a constant level. Therefore, when a projection lens is exchanged to manufacture the next projection lens, the lens to be adjusted can be approximately located around a position of the optical axis and only fine adjustment of the deviation of respective projection lens is required, so that the position adjustment work can be facilitated.

The advancement/retraction portion is preferably a micrometer head that advances and retracts the first pin relative to the second pin.

According to the above arrangement, since a micrometer head with high resolution of 1 µm level can be used, the accuracy in adjusting the position of optical axis of the lens can be further enhanced. Incidentally, the micrometer head can be appropriately exchanged to the one with different resolution in accordance with the design of the projection lens to be manufactured.

The projection lens manufacturing apparatus described above preferably includes a drive mechanism that moves the projection lens holding mechanism from a position where the projection lens position adjuster is located to a position where a projection lens to be manufactured is supplied.

According to the above arrangement, since the drive mechanism moves the lens holding mechanism between the position where the projection lens position adjuster is provided and the position where a projection lens to be manufactured is supplied, the adjusting position and the supplying position of the projection lens are separated, so that the projection lens can be easily set at a position without interfering with other mechanisms.

The drive mechanism preferably includes a rotary drive mechanism that rotates the lens holding mechanism around a base end of an arm connected to the lens holding mechanism on a plane orthogonal to the illuminating optical axis and moves the lens holding mechanism between a position on the illumination optical axis and a position off the illuminating optical axis.

Since the lens holding mechanism turns around the base end of the arm between the position on and off the illuminating optical axes, when the projection lens is set at a position off the illuminating optical axis, the projection lens can be easily set on the position without interfering with other mechanisms, thereby efficiently manufacturing the projection lens.

In the projection lens manufacturing apparatus described above, an adhesive injection hole for injecting an adhesive for bonding the lens of which position has been adjusted is preferably formed on the lens-holding barrel, and the bonding mechanism preferably includes a light beam irradiator that cures a photo-curing adhesive injected into the adhesive injection hole.

The adhesive may be manually injected into the adhesive injection hole or may be automatically injected by providing an adhesive-injecting portion for injecting the photo-curing adhesive into the adhesive injecting hole to the bonding mechanism of the projection lens manufacturing apparatus.

The bonding mechanism may include an inserting portion inserted into the adhesive injecting hole formed on the projection lens such as an adhesive-injecting tube for injecting ultraviolet-curing adhesive, where an adhesive is injected from the adhesive-injecting portion through which a light beam, such as ultraviolet is irradiated from the light beam irradiating portion. The pins and the adhesive-injecting tube may be disposed in parallel and may be integrated. The position of the adhesive-injecting holes may be rearranged in accordance with the integral arrangement described above.

According to the above-described arrangement, the lens can be bonded to the lens-holding barrel by irradiating the light beam from the light beam irradiating portion after injecting the photo-curing adhesive from the adhesive-injecting portion through the adhesive-injecting hole after the lens position is adjusted by the lens position adjuster. Since the lens is bonded with the lens position being fixed, production failure caused during the bonding process can be minimized.

The projection lens manufacturing apparatus described above may preferably include a light-shielding mechanism provided on the optical path between the light source and the projection lens, the light-shielding mechanism blocking the light beam irradiated by the light source from being introduced into the projection lens.

The light-shielding mechanism may be a plate-shaped member and the like for shielding the light from the light source provided on the optical path between the light source and projection lens.

According to the above arrangement, when the photo-curing adhesive is cured by irradiating a light beam by the light beam irradiating portion, the photo-curing adhesive is not erroneously cured by mixing the light beam irradiated by the light source.

In the projection lens manufacturing apparatus described above, a screen on which the image light is projected through the projection lens is preferably located on the downstream of the optical path of the projection lens.

According to the above arrangement, since the position of the projection lens can be adjusted while observing the image projected on the screen in an enlarged manner, the position of the optical axis can be accurately adjusted.

In the projection lens manufacturing apparatus described above, the optical path from the light source to the projection lens is preferably arranged approximately along a vertical direction.

According to the above arrangement, since the optical path is arranged along the vertical direction, the plurality of lenses of the projection lens are horizontally laid, so that the adjusting direction of the lens to be adjusted becomes horizontal. Even when the injecting portion (e.g. the adhesive-injecting tube for injecting ultraviolet-curing adhesive) is horizontally laid relative to the pin, the adhesive remaining on the tip of the inserting portion flows in vertical direction, so that the adhesive is not adhered on the tip of pins, thereby efficiently manufacturing the projection lens.

In the projection lens manufacturing apparatus described above, a reflection member that reflects to bend the optical path of the image light irradiated by the projection lens and a screen on which the reflected image light is projected are preferably provided on the downstream of the optical path of the projection lens.

For instance, the reflection member may reflect the image light irradiated by the projection lens approximately at right angle.

When the image light irradiated by the projection lens is reflected by the reflection member at right angle to be projected on the screen, the optical path direction of the manufacturing apparatus body is arranged parallel to the screen surface. Therefore, the manufacturing apparatus body other than the screen can be downsized as compared to an arrangement in which the optical path from the manufacturing apparatus body to the screen is linearly arranged in vertical direction.

A projection lens manufacturing method according to another aspect of the present invention is for manufacturing a projection lens including a lens-holding barrel in which an optical path is set, a plurality of lenses sequentially disposed on an illuminating optical axis of the optical path, and a pair of position-adjusting holes formed on the lens-holding barrel, the position-adjusting holes being used for adjusting the position of at least one of the plurality of the lenses in a direction along mutually orthogonal two axes on a plane orthogonal to the illuminating optical axis, the method including the steps of: holding the projection lens to be adjusted at a lens adjusting position for adjusting the position of the lens to be adjusted on the illuminating optical axis; irradiating an adjustment light beam by a light source; generating an image light including a predetermined test pattern in accordance with the light beam irradiated by the light source and introducing the image light into the projection lens located on the illuminating optical axis; adjusting the positions of the respective lenses to be adjusted along the two axes through the position adjusting hole while detecting the image light irradiated by the projection lens into which the image light is introduced; and bonding the lens with the position thereof being adjusted on the lens holding barrel.

According to the above aspect of the present invention, since the projection lens can be manufactured in the same manner as described above, approximately the same advantages as the projection lens manufacturing apparatus of the projection lens can be obtained, and the present invention can be achieved. In other words, one of the lenses of the projection lens can be independently adjusted along the two mutually orthogonal axes with high accuracy. Therefore, the direction to be adjusted can be easily recognized as compared to a related art arrangement, thereby facilitating the adjustment work. Further, since the pins for adjusting the position of the lens are provided on the manufacturing apparatus instead of the side of the projection lens, the number of the components of the projection lens can be reduced, thereby reducing manufacturing cost, size and weight of the projection lens.

In the projection lens manufacturing method, since the lens itself is moved instead of the lens-holding barrel, the optical axes of other lenses fixed to the lens-holding barrel (if present) are not shifted relative to the adjustment light source. Therefore, the axes of other lenses and the lens to be adjusted can be easily aligned, thereby adjusting the position of the optical axis of the lens with high accuracy.

Since the lens to be adjusted is bonded to the lens-holding barrel body after the position thereof being adjusted, the lens-holding barrel is not distorted by adjusting the position of the lens. Therefore, since there is no need to provide a distortion absorber on the lens-holding barrel, the size of the lens holding frame and the projection lens can be reduced. Further, since the lens-holding barrel is not distorted, there is no need to heat the lens-holding barrel for removing distortion. Accordingly, a heat-sensitive material can be used for the lens, so that the lens material is not limited. Additionally, since the position of the lens is adjusted before being bonded to the lens-holding barrel, the position of the lens can be finely adjusted with ease and with high accuracy.

A projection lens according to still another aspect of the present invention is manufactured by the above projection lens manufacturing method. According to the above aspect of the present invention, approximately the same advantages as the manufacturing apparatus and the method of projection lens can be obtained, so that a projection lens capable of adjusting the position of the optical path with high accuracy, projecting the image with high quality and reducing the manufacturing cost can be provided.

A projector according to further aspect of the present invention includes the above projection lens. According to the above aspect of the present invention, approximately the same advantages as the projection lens can be obtained, where the manufacturing cost can be reduced and a high-quality image can be projected.

DETAILED DESCRIPTION OF PREFERRED EMBODIMENTS

1. First Exemplary Embodiment

Figure 1:
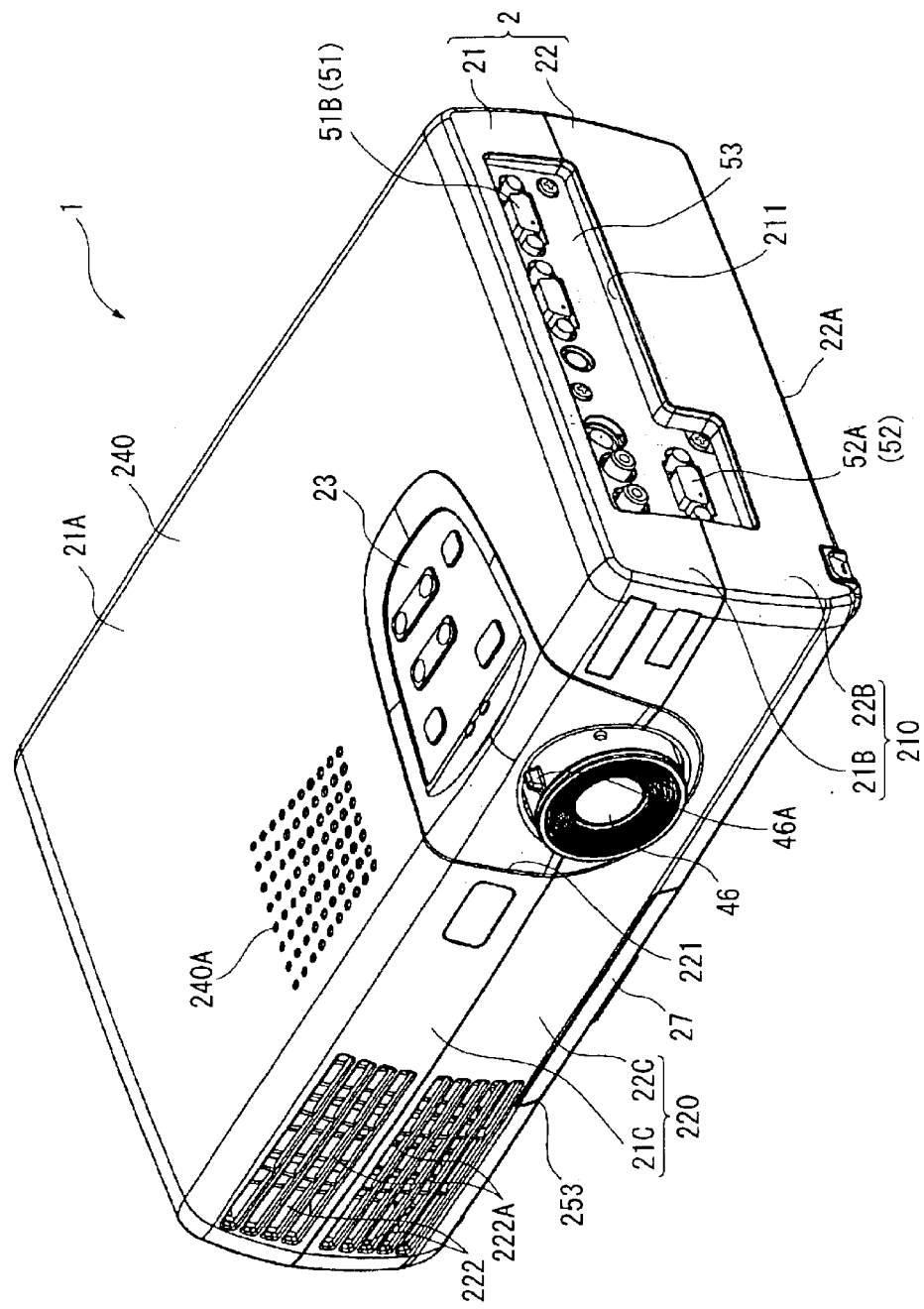
FIG. 1 is a perspective view showing a projector according to an exemplary embodiment of the present invention from upper front side thereof.
Figure 2:
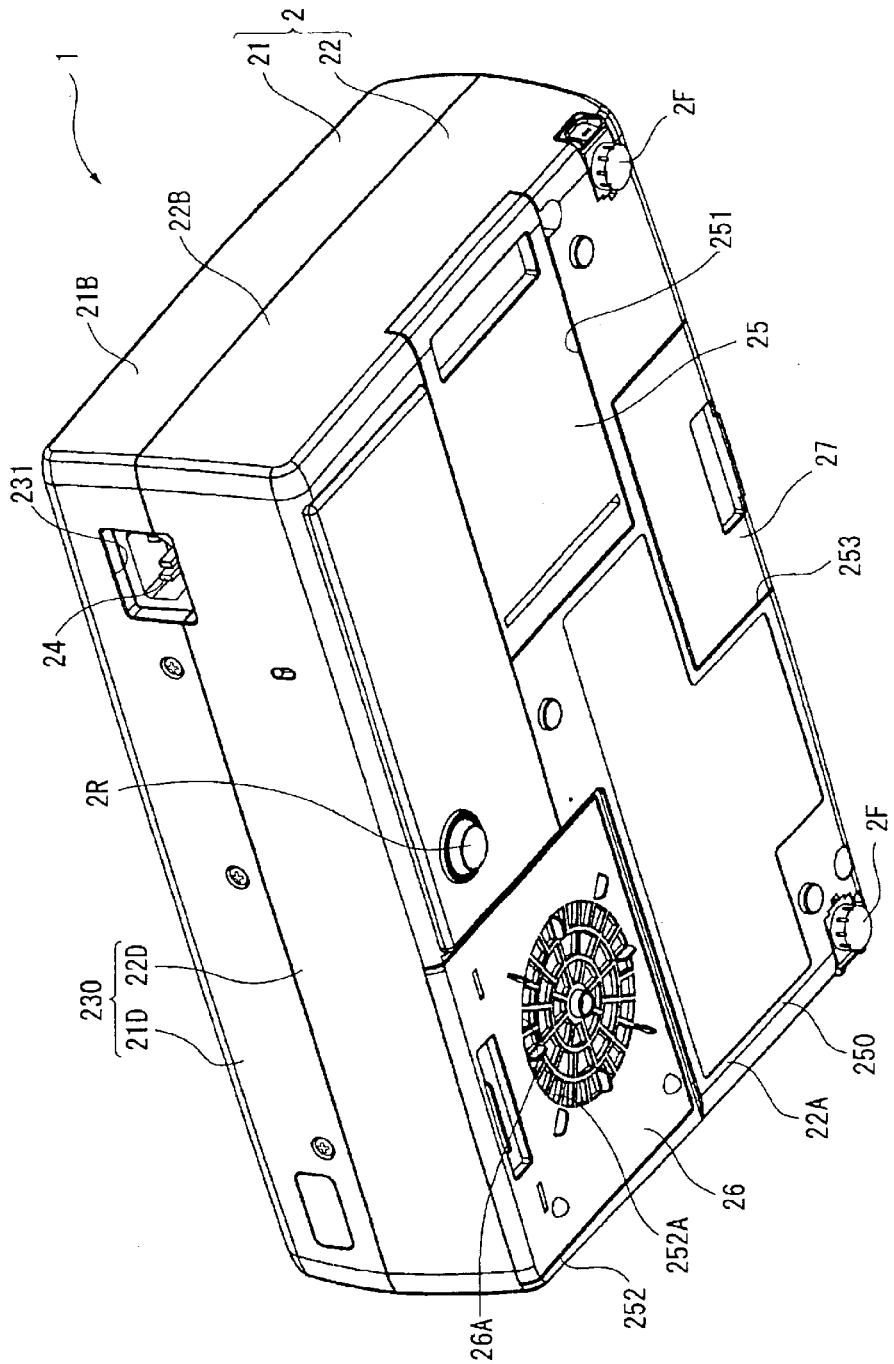
FIG. 2 is a perspective view showing the projector from lower rear side thereof.

A first exemplary embodiment of the present invention will be described below with reference to attached drawings.
Primary Arrangement of Projector FIG. 1 is a perspective view of a projector 1 seen from upper front side according to an aspect of the present invention. FIG. 2 is a perspective view of the projector 1 seen from lower rear side.

As shown in FIGS. 1 and 2, the projector 1 has an approximately rectangular parallelepiped exterior case 2 made by injection molding. The exterior case 2 made of synthetic-resin is a casing for housing a body of the projector 1, which includes an upper case 21 and a lower case 22, the cases 21 and 22 being attachable and detachable.

As shown in FIGS. 1 and 2, the upper case 21 includes an upper portion 21A, a lateral portion 21B, a front portion 21C and a rear portion 21D respectively constituting the upper side, lateral side, front side and rear side of the projector 1.

In the same manner, the lower case 22 includes a lower portion 22A, a lateral portion 22B, a front portion 22C and a rear portion 22D respectively constituting the lower side, lateral side, front side and rear side of the projector 1.

Accordingly, as shown in FIGS. 1 and 2, the lateral sides 21B and 22B of the upper case 21 and the lower case 22 are continuously connected to form a lateral side 210 of the rectangular parallelepiped exterior case 2. Similarly, the front portions 21C and 22C are connected to form a front side 220, the rear portions 21D and 22D are connected to form a rear side 230, the upper portion 21A forms an upper side 240 and the lower portion 22A forms a lower side 250.

As shown in FIG. 1, an operation panel 23 is provided on the front side of the upper side 240, and a sound-outputting speaker hole 240A is formed around the operation panel 23.

An opening 211 spanning over the two lateral portions 21B and 22B is formed on the lateral side 210 on the right side seen from front side. A below-described main board 51 and an interface board 52 are provided in the exterior case 2 and a connector 51B installed on the main board 51 and a connector 52A installed on the interface board 52 are exposed to the outside through an interface panel 53 attached to the opening 211. Exterior electronics etc. are connected to the projector through the connectors 51B and 52A.

A circular opening 221 spanning between two front portions 21B and 22C is formed around the operation panel on the right side seen from the front side 220. A projection lens 46 is disposed inside the exterior case 2 corresponding to the opening 221. At this time, a distal end of the projection lens 46 is exposed to the outside from the opening 221 and the focusing operation of the projection lens 46 can be manually conducted through a lever 46A as a part of the exposed portion.

An exhaust hole 222 is formed on the front side 220 opposite to the opening 221. A safety cover 222A is formed on the exhaust hole 222.

As shown in FIG. 2, a rectangular opening 231 is formed on the right side of the rear side 230 seen from rear side. An inlet connector 24 is exposed from the opening 231.

A rectangular opening 251 is formed at the center of the right end of the lower side 250 seen from bottom side. A lamp cover 25 covering the opening 251 is detachably attached to the opening 251. A non-illustrated light source lamp can be easily exchanged by detaching the lamp cover 25.

A rectangular surface 252 dented inward is formed on the left rear corner of the lower side 250 seen from bottom side. An intake 252A for drawing in cooling air from the outside is formed on the rectangular surface 252. An intake cover 26 covering the rectangular surface is detachably provided on the rectangular surface 252. An opening 26A corresponding to the intake 252A is formed on the intake cover 26. A non-illustrated air filter is provided on the opening 26A to prevent invasion of dust into the interior of the casing.

A rear leg 2R constituting one of the legs of the projector 1 is formed approximately at the center on the rear side of the lower side 250. Further, front legs 2F also constituting the legs of the projector 1 are respectively provided on the right and left corners on the front side of the lower side 250. In other words, the projector 1 is supported on three points by the rear leg 2R and the two front legs 2F.

The two front legs 2F are vertically advanceable and retractable, so that the inclination (attitude) of the projector 1 in front and back direction and right and left direction can be adjusted to adjust the position of the projection image.

Further, as shown in FIGS. 1 and 2, a rectangular parallelepiped recess 253 is formed approximately at the center of the front side of the exterior case 2 spanning over the lower side 250 and the front side 220. A cover 27 covering the lower side and front side of the recess 253 and slidable in front and back direction is provided on the recess 253. A non-illustrated remote controller for remotely controlling the projector 1 is housed in the recess 253 covered by the cover 27.

Figure 3:
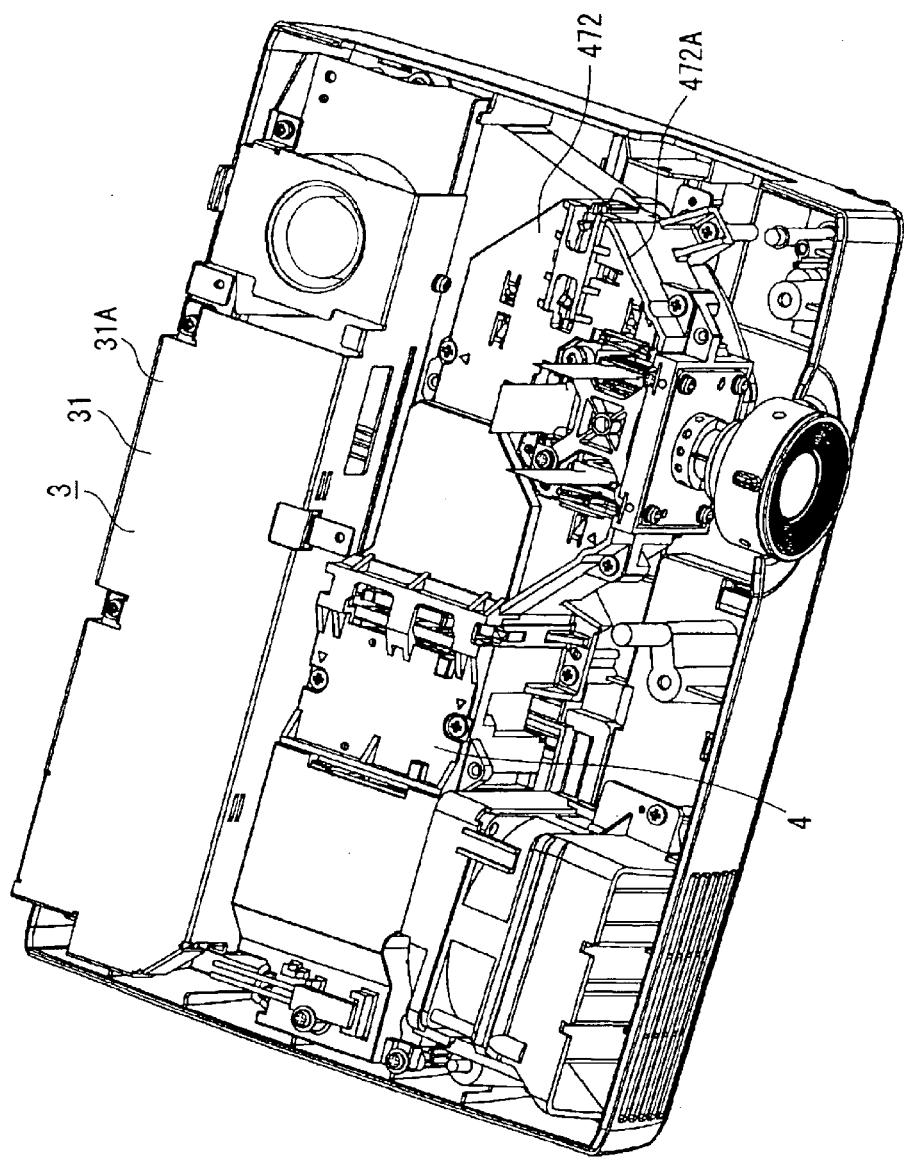
FIG. 3 is a perspective view showing the interior of the projector, which specifically shows the projector shown in FIG. 1 with an upper case thereof being detached.
Figure 4:
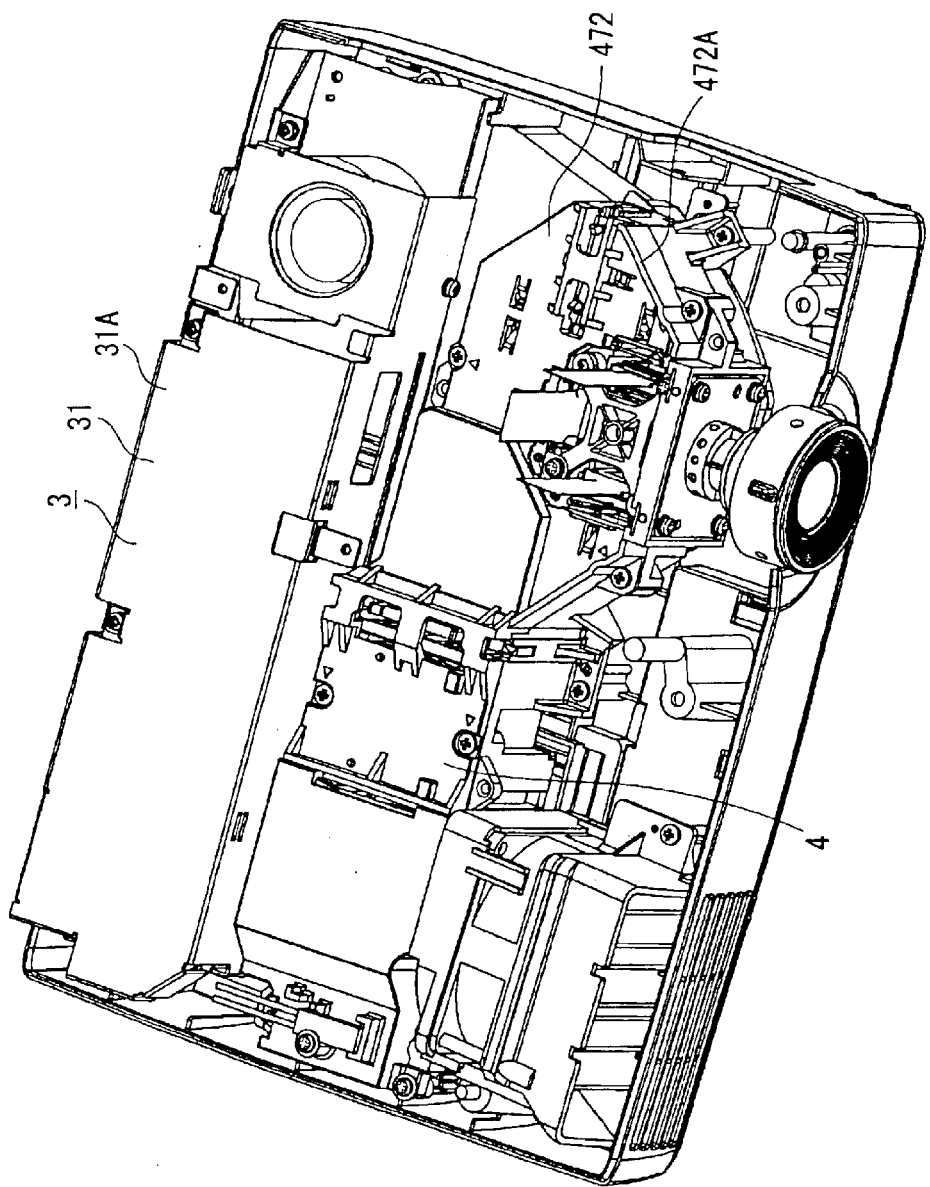
FIG. 4 is a perspective view showing the interior of the projector, which specifically shows the projector shown in FIG. 3 with a control board thereof being detached.

FIGS. 3 and 4 are perspective views showing the interior of the projector 1. Specifically, FIG. 3 is an illustration showing the upper case 21 being removed from FIG. 1. FIG. 4 is an illustration with a control board 5 being removed from FIG. 3.

As shown in FIGS. 3 and 4, the exterior case has a power source unit 3 disposed along the rear side and extending in right and left direction, an optical unit 4 disposed on the front side of the power source unit 3 as a planarly-viewed L-shaped optical system and the control board 5 as a controller disposed on the upper right side of the units 3 and 4. The components 3 to 5 constitute the primary portion of the projector 1.

The power source unit 3 has a power source 31 and a non-illustrated lamp driving circuit (ballast) disposed below the power source 31.

The power source 31 supplies the electric power from the outside to the lamp driving circuit, the circuit board 5 etc. through a non-illustrated power cable connected to the inlet connector.

The lamp driving circuit supplies electric power fed by the power source 31 to a light source lamp (not shown in FIGS. 3 and 4) of the optical unit 4, which is electrically connected to the light source lamp. The lamp driving circuit is, for instance, constructed by wiring on a board.

The power source 31 and the lamp driving circuit are vertically arranged approximately in parallel, which occupy the space extending in right and left direction on the rear side of the projector 1.

The surroundings of the power source 31 and the lamp driving circuit are covered with a metal shield 31A such as aluminum with right and left sides thereof being opened.

The shield 31A works as a duct for guiding the cooling air and prevents leakage of the electromagnetic noise generated by the power source 31 and the lamp driving circuit toward the outside.

As shown in FIG. 3, the control board 5 is disposed to cover the upper side of the units 3 and 4, which includes the main board 51 including a CPU and the connector 51B and the interface board 52 disposed below the main board 51 and including the connector 52A.

In the control board 5, the CPU on the main board 51 controls a liquid crystal panel of the below-described optical device in accordance with the image information inputted through the connectors 51B and 52A.

The surroundings of the main board 51 is covered with a metal shield 51A. Though not clearly shown in FIG. 3, the main board 51 abuts to an upper end 472A of an upper inner case 472 of the optical unit 4 (FIG. 4).

Detailed Construction of Optical Unit

Figure 5:
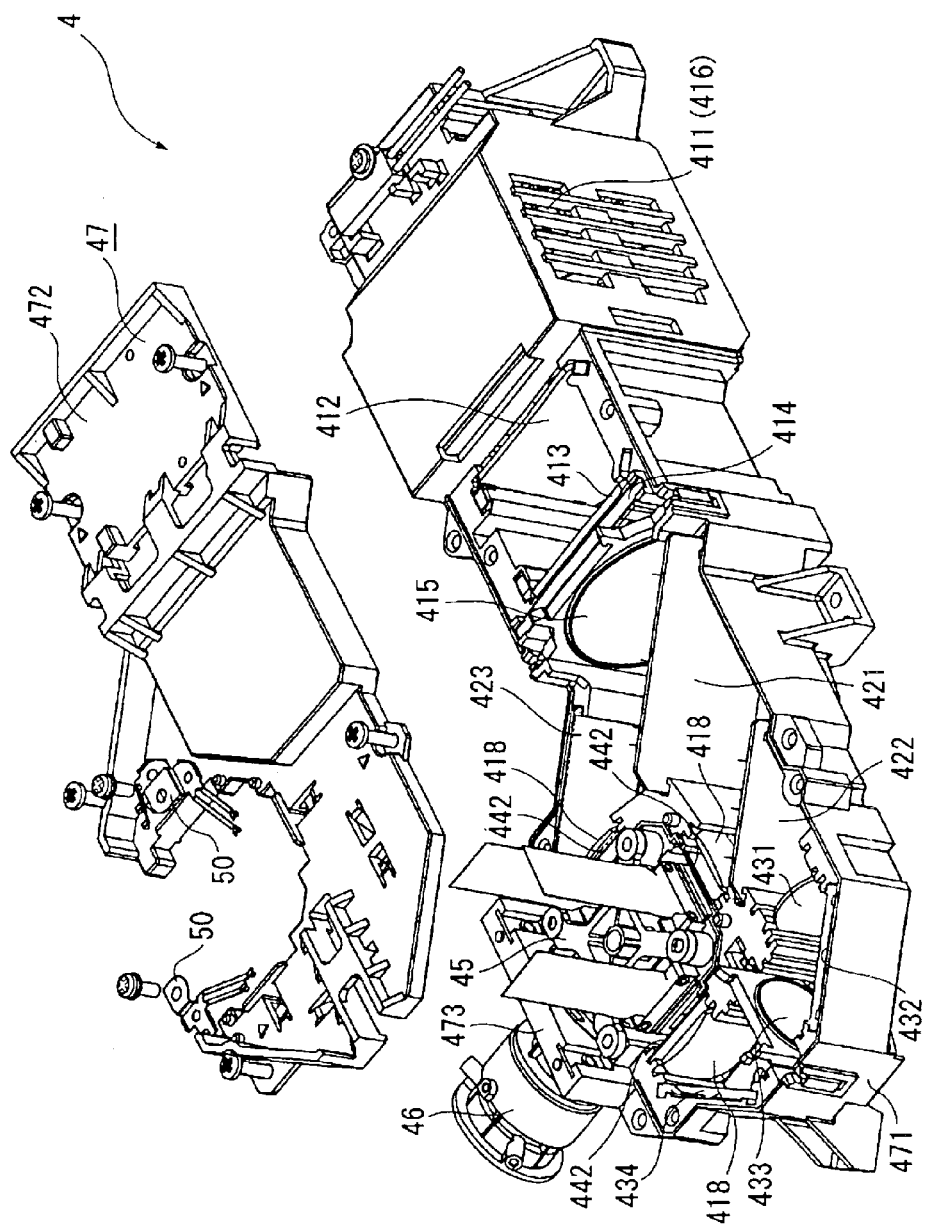
FIG. 5 is an exploded perspective view showing an optical unit of the projector.
Figure 6:
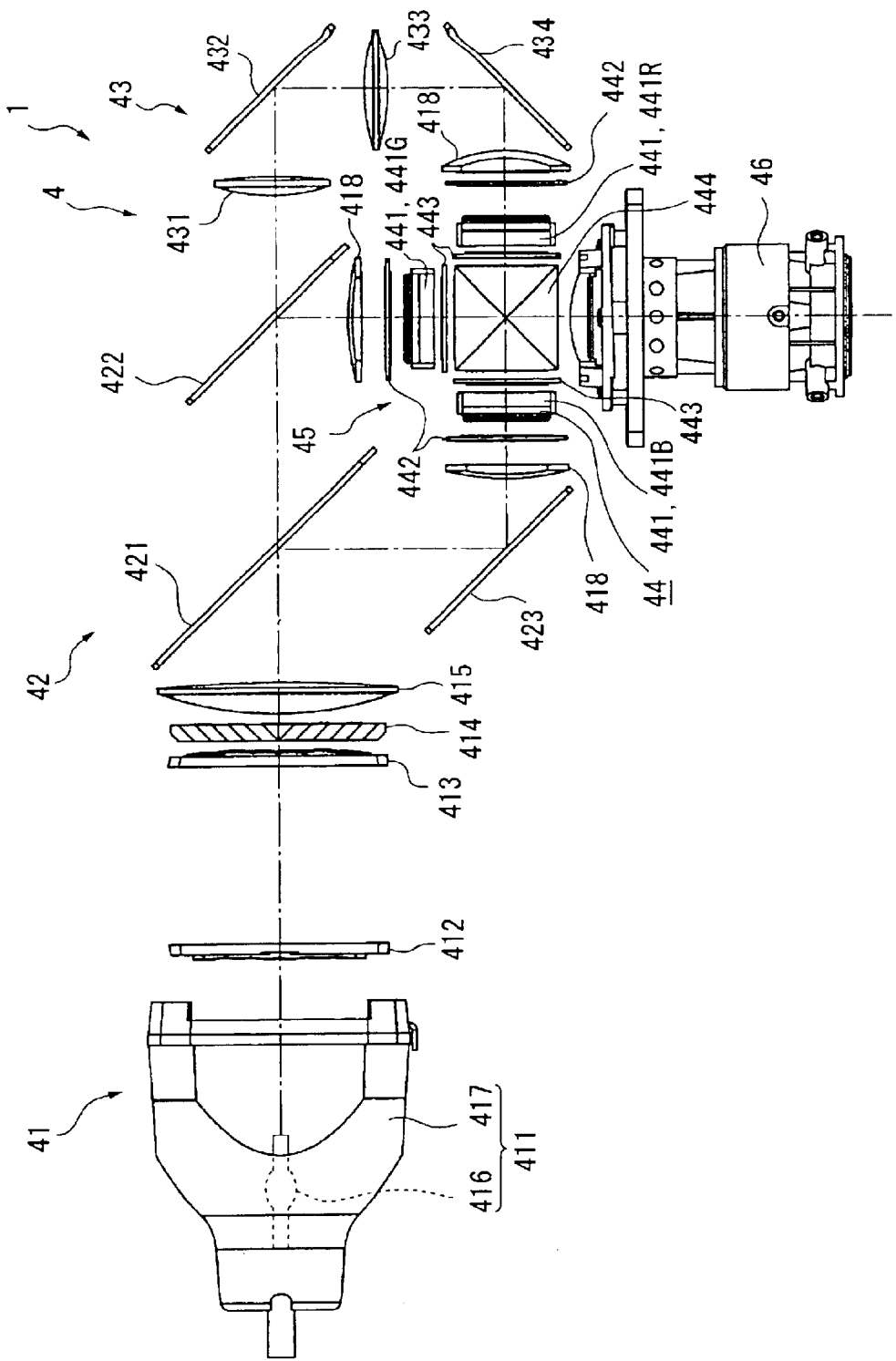
FIG. 6 is a schematic showing the optical unit.

FIG. 5 is an exploded perspective view showing the optical unit 4. FIG. 6 is a schematic illustration of the optical unit 4.

As shown in FIG. 6, the optical unit 4 is a unit for optically process the light beam irradiated by a light source lamp 416 of a light source 411 to form an optical image corresponding to the image information and project the optical image in an enlarged manner, which includes an integrator illuminating optical system 41, a color separating optical system 42, a relay optical system 43, an optical device 44, the projection lens 46 as a projection optical system, and an inner case 47 made of synthetic resin for housing the optical components 41 to 44 and 46 (FIG. 5).

The integrator illuminating optical system 41 is a system for substantially uniformly illuminating the image formation area of the three liquid crystal panels 441 constituting the optical device 44 (respectively referred to as liquid crystal panel 441R, 441G and 441B for every color lights of red, green and blue), which includes the light source 411, a first lens array 412, a second lens array 413, a polarization converter 414 and a superposing lens 415.

The light source 411 has the light source lamp 416 as a radiation light source and a reflector 417, which changes the radial light beam irradiated by the light source lamp 416 into a parallel light beam by the reflector 417 to emit the parallel light beam toward the outside. A high-pressure mercury lamp is used as the light source lamp 416. Incidentally, metal halide lamp and a halogen lamp etc. may be used instead of the high-pressure mercury lamp. A parabolic mirror is used as the reflector 417. Incidentally, a combination of parallelizing concave lens and ellipsoidal mirror may be used instead of the parabolic mirror.

The first lens array 412 is a plurality of small lenses arranged in matrix, the lenses having substantially rectangular profile viewed from optical axis direction. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412 where the small lenses are disposed in matrix. The second lens array 413 as well as the superposing lens 415 focuses the image from the respective small lenses of the first lens array 412 onto the liquid crystal panel 441.

The polarization converter 414 is disposed between the second lens array 413 and the superposing lens 415. The polarization converter 414 converts the light from the second lens array 413 to uniform polarized light in order to enhance light utilization efficiency in the optical device 44.

Specifically, the respective sub-beams converted into single polarized light by the polarization converter 414 are substantially superposed on the liquid crystal panel 441 of the optical device 44 by superposing lens 415. Since the projector 1 using the liquid crystal panel 441 for modulating polarized light can use only single polarized light, approximately half of the light from the light source lamp 416 emitting other random polarized light cannot be used. Accordingly, by using the polarization converter 414, all of the light emitted from the light source lamp 416 is converted into single polarized light to enhance light utilization efficiency in the optical device 44. Incidentally, such polarization converter 414 is disclosed in, for instance, Japanese Patent Laid-Open Publication No. Hei 8304739.

The color separating optical system 42 has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has incident-side lens 431, a relay lens 433 and reflection mirrors 432 and 434, and introduces the red color light separated by the color separating optical system 42 onto the liquid crystal panel 441R.

At this time, the red light component and the green light component of the light beam irradiated from the integrator illuminating optical system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective sub-beams emitted from the second lens array 413 into a light beam parallel to central axis (main beam) thereof. The field lenses 418 provided in front of the other liquid crystal panels 441G and 441R function in the same manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights, in other words, in order to directly transmit the sub-beam incident on the incident-side lens 431 to the field lens 418. Incidentally, though the red light passes through the relay optical system 43, blue light may pass through the relay optical system 43 instead of red light.

The optical device 44 is for modulating the incident light beam in accordance with image information to form a color image, which has three incident-side polarization plates 442, the liquid crystal panels 441R, 441G and 441B disposed on the after-stage of the respective incident-side polarization plates 442 as optical modulators, an irradiation-side polarization plate 443 disposed on the after-stage of the respective liquid crystal panels 441R, 441G and 441B, and a cross dichroic prism 444 as a color combining optical system.

The liquid crystal panels 441R, 441G and 441B use, for instance, a polysilicon TFT as a switching element.

In the optical device 44, the color lights separated by the color-separating optical system 42 are modulated by the three liquid crystal panels 441R, 441G and 4411B, the incident-side polarization plate 442 and the irradiation-side polarization plate 443 in accordance with image information to form an optical image.

The incident-side polarization plate 442 transmits only a polarized light of a predetermined direction among the respective color lights separated by the color separating optical system 42 and absorbs the other light beam, which is constructed by forming a polarization film on a substrate of sapphire glass etc. Incidentally, polarization film may be formed on the field lens 418 without employing the substrate.

The irradiation-side polarization plate 443 is constructed in an approximately the same manner as the incident-side polarization plate 442 which transmits only a polarized light of a predetermined direction among the light beam irradiated by the liquid crystal panels 441 (441R, 441G and 441B) and absorbs the other light beam. Incidentally, polarization film may be formed on the cross dichroic prism 444 without employing substrate.

The polarization axes of the incident-side polarization plate 442 and the irradiation-side polarization plate 443 are set orthogonal with each other.

The cross dichroic prism 444 combines the optical image irradiated by the irradiation-side polarization plate 443 and modulated for respective color lights to form a color image. A dielectric multi-layer film for reflecting red color light and a dielectric multi-layer film for reflecting blue color light are formed along boundary of four right-angled prisms of the cross dichroic prism 444, the dielectric multi-layer films combining three color lights.

The projection lens 46 enlarges and projects the color image combined by the cross dichroic prism 444 of the optical device 44.

As shown in FIG. 5, the inner case 47 has the lower inner case 471 having a groove on which the optical components 412 to 415, 418, 421 to 423, 431 to 434 and 442 are slidably fitted from the above, and a lid-shaped upper inner case 472 for closing the upper opening of the lower inner case 471.

As shown in FIG. 5, the light source 411 is housed on a side of the lower inner case 471 of approximately planarly-viewed L-shape. The projection lens 46 is screwed to the other end of the lower inner case 471 through a head component 473 formed on the lower inner case 471. By the way, the detail of the projection lens 46 will be described later.

As shown in FIG. 5, the optical device body 45 housed in the lower inner case 471 is screwed to the lower inner case 471 with two springs 50 being sandwiched. The two springs 50 bias the field lens 418 and the incident-side polarization plate 442 toward lower side to fix the position thereof.

Arrangement of Projection Lens

Figure 7:
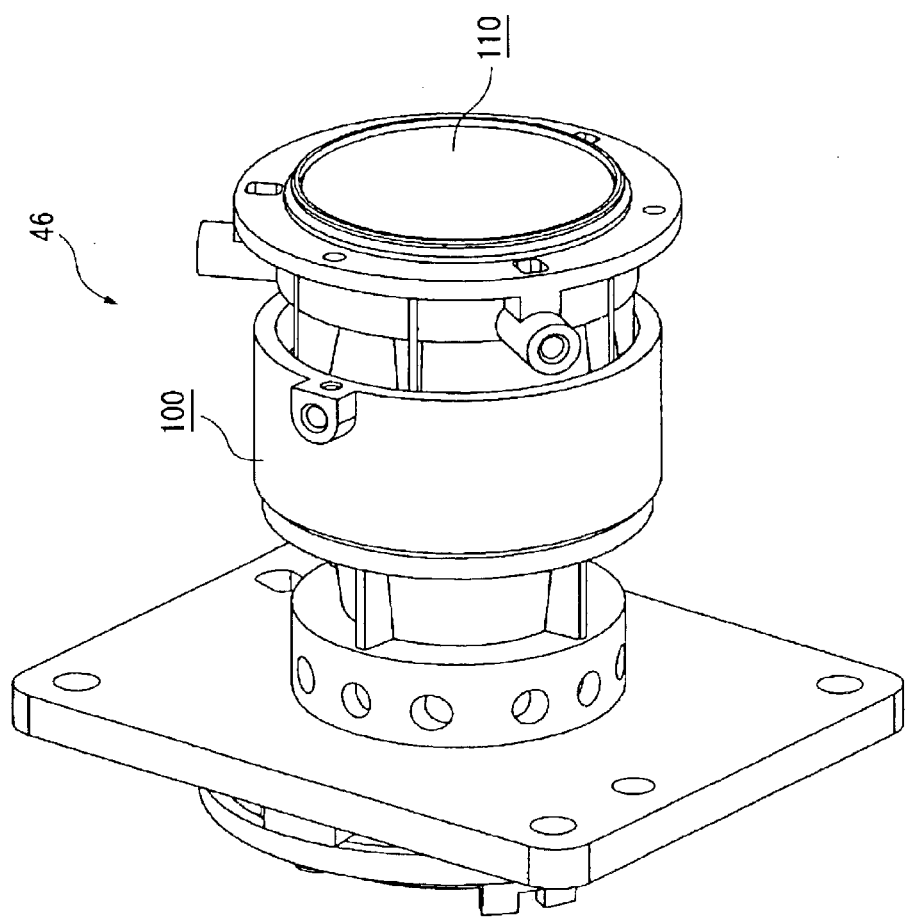
FIG. 7 is a perspective view showing a projection lens of the optical unit seen from front (projection) side thereof.
Figure 8:
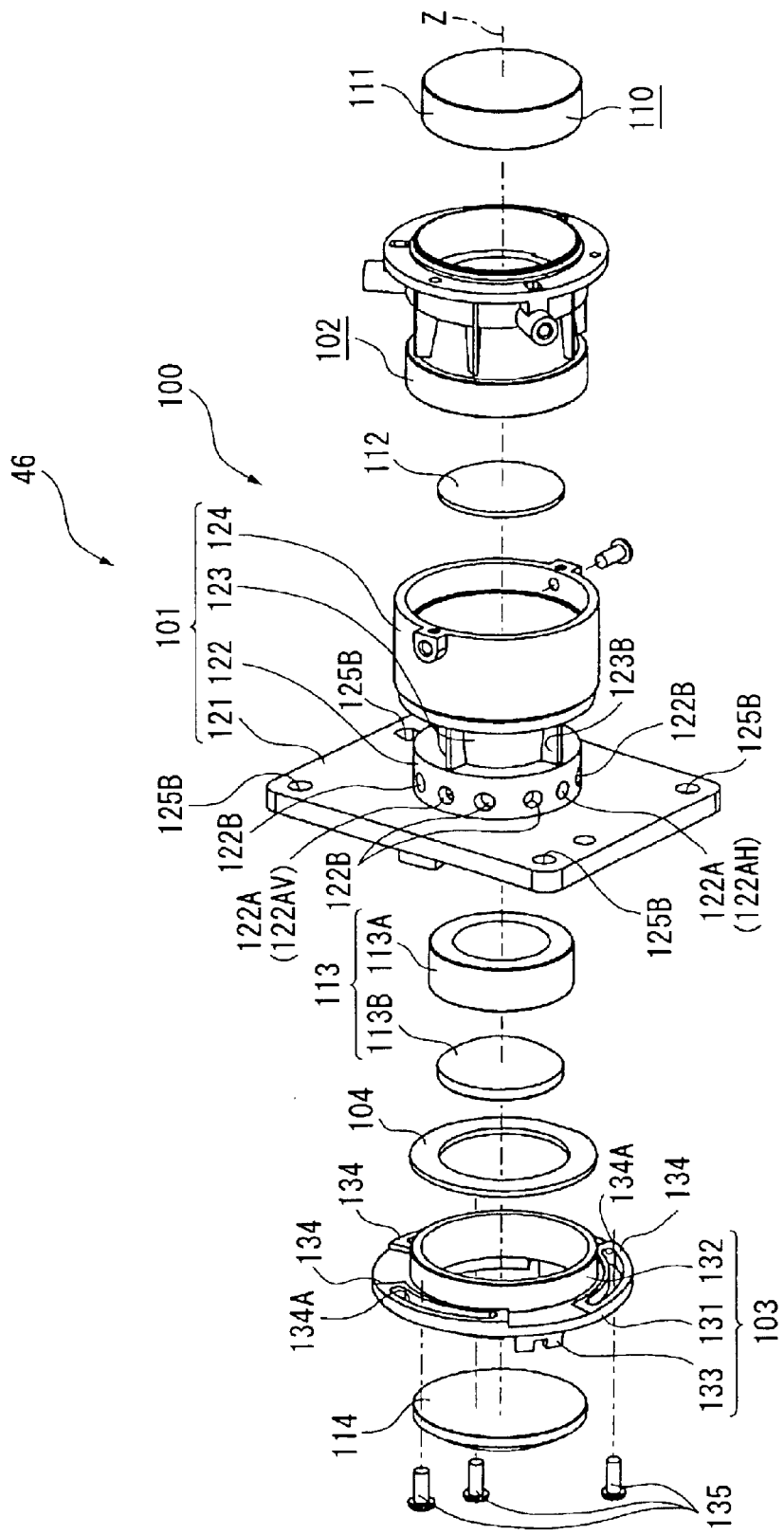
FIG. 8 is an exploded perspective view showing the projection lens.
Figure 9:
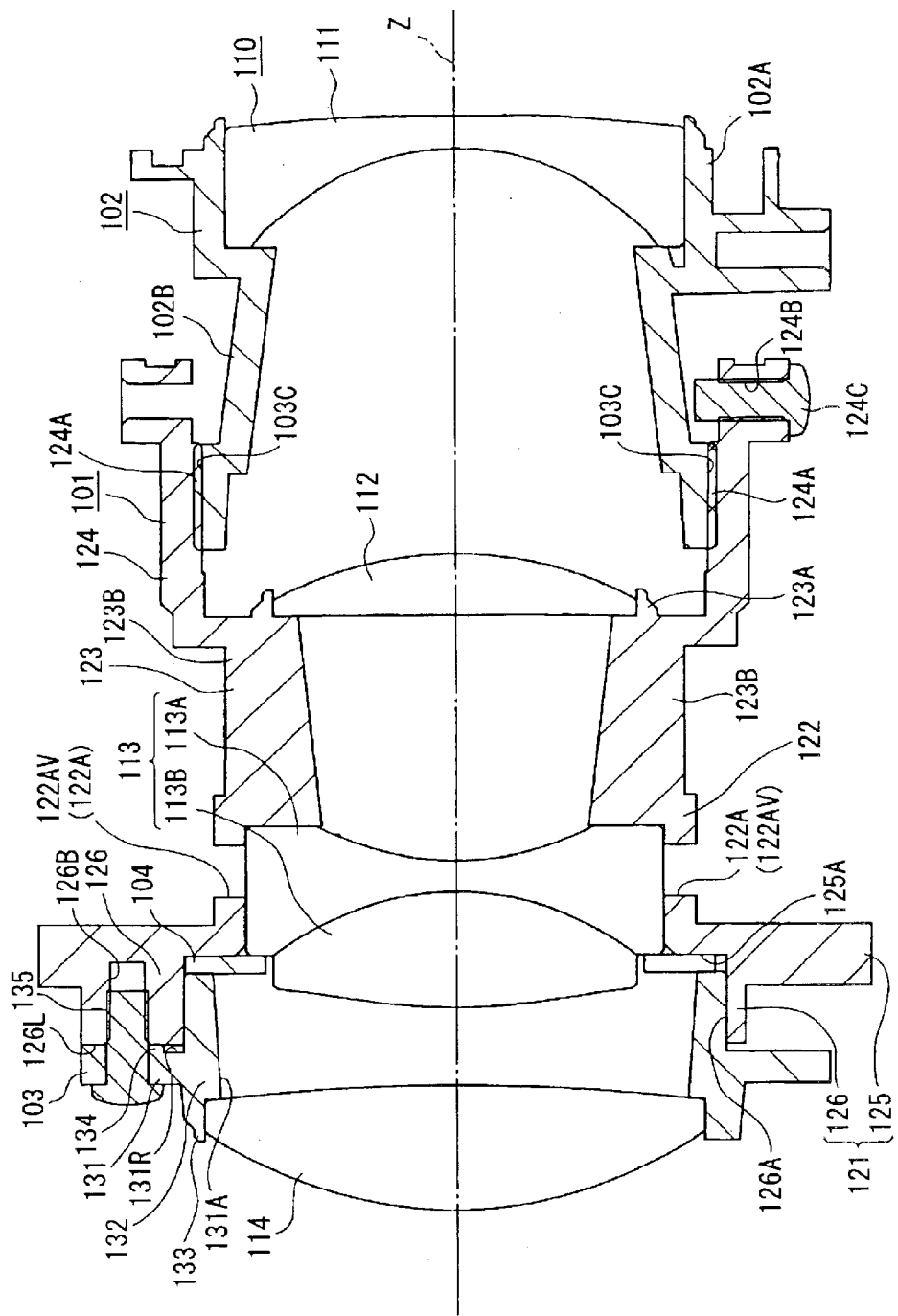
FIG. 9 is a vertical sectional view showing the projection lens.
Figure 10:
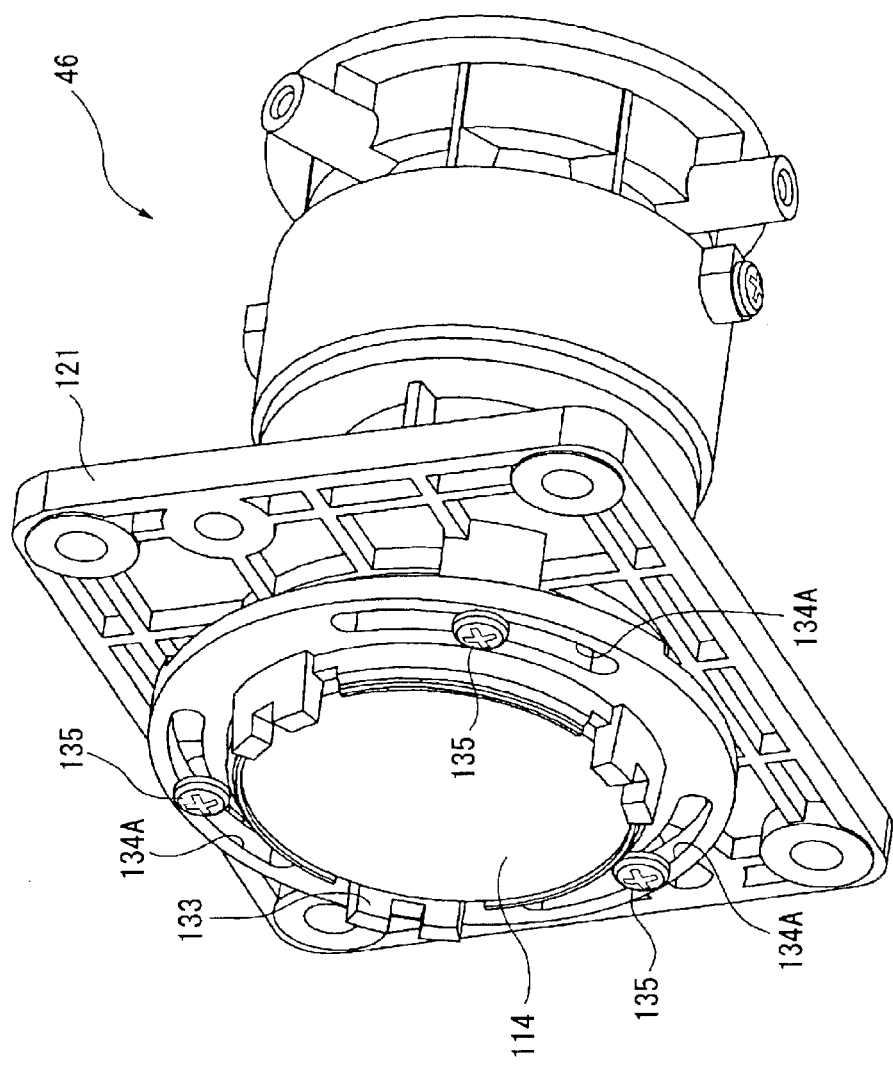
FIG. 10 is a perspective view showing the projection lens seen from rear side thereof.

FIG. 7 is a perspective view showing the projection lens 46 from front (projection) side thereof. FIG. 8 is an exploded perspective view showing the projection lens 46. FIG. 9 is a vertical sectional view showing the projection lens 46. FIG. 10 is a perspective view showing the projection lens 46 from rear side thereof.

As shown in FIG. 6, the projection lens 46 enlarges and projects a color image combined by the cross dichroic prism 444 of the optical device body 45.

As shown in FIG. 7, the projection lens 46 includes a lens-barrel 100 made of resin etc. with a predetermined optical path being set thereinside, and a lens group 110 as a plurality of lenses sequentially arranged on the illuminating optical axis of the optical path inside the lens-barrel 100.

As shown in FIGS. 8 and 9, the lens group 110 includes four group lenses, i.e., a first group lens 111, a second group lens 112, a third group lens 113 and a fourth group lens 114 sequentially arranged from the projection side (right side in the drawings).

The first group lens 111 is an aspherical concave lens for enlarging and projecting the image in up-shift direction. The second group lens 112 is a convex lens for adjusting the light-beam. The third group lens 113 is a balsam lens composed of a concave lens 113A and a convex lens 113B adhered on the concave lens 113A, the convex lens 1133B being smaller than the concave lens 113A and having aspherical surface on the light-irradiation side thereof. The fourth group lens 114, formed as a spherical lens, is a convex lens for receiving the image light beam.

After the image light irradiated by the cross dichroic prism enters into the spherical fourth group lens 114, the color aberration of the image light is corrected by the balsam third group lens 113 and subsequently the luminous energy is adjusted by the second group lens 112 to be projected to the outside in an enlarged manner while correcting distortion by the aspheric first lens 111.

As shown in FIGS. 8 and 9, the lens-barrel 100 includes a lens-barrel body 101 as a lens-holding barrel fixed to an end of the lower inner case, a front frame 102 attached on the projection side of the lens-barrel body 11 (right side in the drawings), and a rear frame 103 attached on a side opposite to the projection side of the lens-barrel body 101 (left side in the drawings).

The lens-barrel body 101 is a synthetic resin member for housing the third group lens 113 to be adjusted at the predetermined position after being adjusted, which has a flat plate-shaped collar 121 screwed to the attachment surface of the lower inner case 471 (see FIG. 4), a cylindrical attitude adjuster 122 formed on the projection side of the collar 121, a cylindrical attachment 124 having greater diameter than the attitude adjuster 122 formed on the projection side of the attitude adjuster 122 through a connector 123.

The collar 121 is a rectangular plate-shaped member attached to the attachment face of the lower inner case for connecting the lower inner case and the projection lens 46.

As shown in FIG. 9, the collar 121 includes a rectangular plate-shaped collar body 125 having an approximately circular opening 125A at the center thereof, and a cylindrical projection 126 surrounding the outer circumference of the opening 125A and projecting from the left side (in the drawing) of the collar body 125.

The opening 125A of the plate-shaped collar body 125 penetrates the right and left sides (in the drawing) so that the image light to be projected passes therethrough.

As shown in FIG. 8, screw insert holes 125B as an attachment with the lower inner case are formed on four corners of the plate-shaped collar 121.

As shown in FIG. 9, the inner circumference of the cylindrical projection 126 defines a recess 126A and, though not entirely illustrated, screw holes 126B are formed on three locations approximately at a regular interval on a left side (in the drawing) 126L of the projection 126.

As shown in FIGS. 8 and 9, the attitude adjuster 122 is formed in a cylindrical shape to surround the opening 125A on the collar body 125, which mainly houses the concave lens 113A of the third of the third group lens 113 in a loosely-fitted manner.

Though not entirely illustrated, circular position-adjusting holes 122A are formed at four positions, i.e., upper, lower, right, and left positions in the drawings, at a regular interval on the outer circumference of the cylindrical attitude adjuster 122. In other words, two position-adjusting holes 122AV out of the four position-adjusting holes 122A are formed at vertically symmetric positions relative to the center of the cylinder, and the other two position-adjusting holes 122AH are formed at horizontally symmetric positions relative to the center of the cylinder. The line connecting the two position-adjusting holes 122AV and the line connecting the two position-adjusting holes 122AH are approximately orthogonal to each other.

Adhesive injection holes 122B for injecting a fluid adhesive such as ultraviolet-curing adhesive are formed on both sides sandwiching the respective position-adjusting holes 122A (122AV, 122AH) at a regular interval.

Accordingly, the attitude adjuster 122 includes four position-adjusting holes 122A formed at upper, lower, left and right positions (in the drawings) at a regular interval and two (total eight) adhesive injection holes 122B provided between mutually adjacent position-adjusting holes 122A.

The connector 123 is a cylindrical member for connecting the attitude adjuster 122 and the attachment 124, the connector 123 having smaller diameter than both of the attitude adjuster 122 and the attachment 124.

As shown in FIG. 9, a lens-holding claw 123A, into which the second group lens 112 is fitted, is formed on the right side of the connector 123 (in the drawing). The second group lens 112 is attached inside the lens-holding claw 123A by heat caulking. The lens-holding claw 123A is arranged to accurately align the center of the second group lens 112 with an optical axis Z with reference to the profile of the second group lens 112

Ribs 123B for reinforcing connection between the attitude adjuster 122 and the attachment 124 are formed on the outer circumference of the connector 123 at positions corresponding to the position-adjusting holes 122A.

The attachment 124 is a cylindrical member extending from right side (in the drawing) of the connector 123 toward the outer circumference, which holds the front frame 102 on the right side (in the drawing). As shown in FIG. 9, an internal thread 124A is formed along the inner circumference of the attachment 124.

A screw insert hole 124B is formed on the lower side (in the drawing) of the attachment 124. A screw 124C is inserted from the outside of the attachment 124 so that the tip end of the screw projects toward the inside of the attachment 124. The screw 124C prevents undesired rotation of the front frame 102.

The front frame 102 is a cylindrical frame member, which includes a lens-holding frame 102A and a connector 102B to be attached to the attachment 124. Though not shown in FIGS. 8 and 9, a decorative cover on which the lever 46A is provided covers the outer circumference of the connector 102B as shown in FIG. 4.

The lens-holding frame 102A is a frame portion into which the first group lens 111 is fitted. The first group lens 111 fitted therein is fixed to the lens-holding frame 102A by heat caulking. The lens-holding frame 102A is arranged to accurately position the center of the first group lens 111 on the optical axis Z with reference to the profile of the first group lens 111.

The connector 102B is inserted to the inside of the attachment 124. An external thread 103C, to be screwed into the internal thread 124A, is formed on the outer circumference of the connector 102B. The internal thread 124A is screwed into the external thread 103C so that the front frame 102 advances and retracts relative to the connector 124 in a direction along the optical axis Z, thereby adjusting focus of the projection image.

As shown in FIGS. 8 and 9, the rear frame 103 includes a disk-shaped rear frame body 131 with an approximately circular opening 131A being formed at the center thereof, a cylindrical projection 132 projecting rightward (in the drawings) from the outer circumference of the opening 131A, and a lens-holding claw 133 extending leftward (in the drawing) from the outer circumference of the opening 131A.

The rear frame body 131 is connected with the left side 126L of the projection 126 of the collar body 125. Adjusters 134 projecting rightward (in the drawings) in circumferential direction are formed at three positions approximately at a regular interval on the right side 131R of the rear frame body 131 (in the drawing).

Each of the adjusters 134 is a gently inclined plane with the same inclination direction. Accordingly, when the rear frame body 131 rotates around the optical axis Z, the rear frame body 131 advances and retracts along the optical axis Z relative to the collar 121 by the length of the projection formed by the inclination to adjust lens focus.

Loose holes 134A passing through the adjusters 134 along the shape thereof from left to right are formed in the attitude adjusters 134. The loose holes 134A also penetrate the rear frame body 131. In other words, the loose holes 134A horizontally penetrate the rear frame 103. Three screws 135 are inserted into the loose holes 134A to be connected with the screw holes 126B of the collar 121.

The projection 132 is inserted into the recess 126A of the collar 121 through a concentric spacer 104 to hold the third group lens 113 by biasing rightward in the drawings. The spacer 104 abuts only to the left side of the outer circumference of the concave lens 113A of the third group lens 113. The convex lens 113B of the third group lens 113 is located in an inner opening of the spacer 104.

As also shown in FIG. 10, the lens-holding claw 133 is a frame portion into which the fourth group lens 114 is fitted. The fourth group lens 114 fitted therein is fixed by heat caulking. The lens-holding claw 133 is arranged to accurately position the center of the fourth group lens 114 on the optical axis Z with reference to the profile of the fourth group lens 114.

Arrangement of Projection Lens Manufacturing Apparatus

Next, a projection lens manufacturing apparatus for manufacturing the projection lens 46 will be described below.

Figure 11:
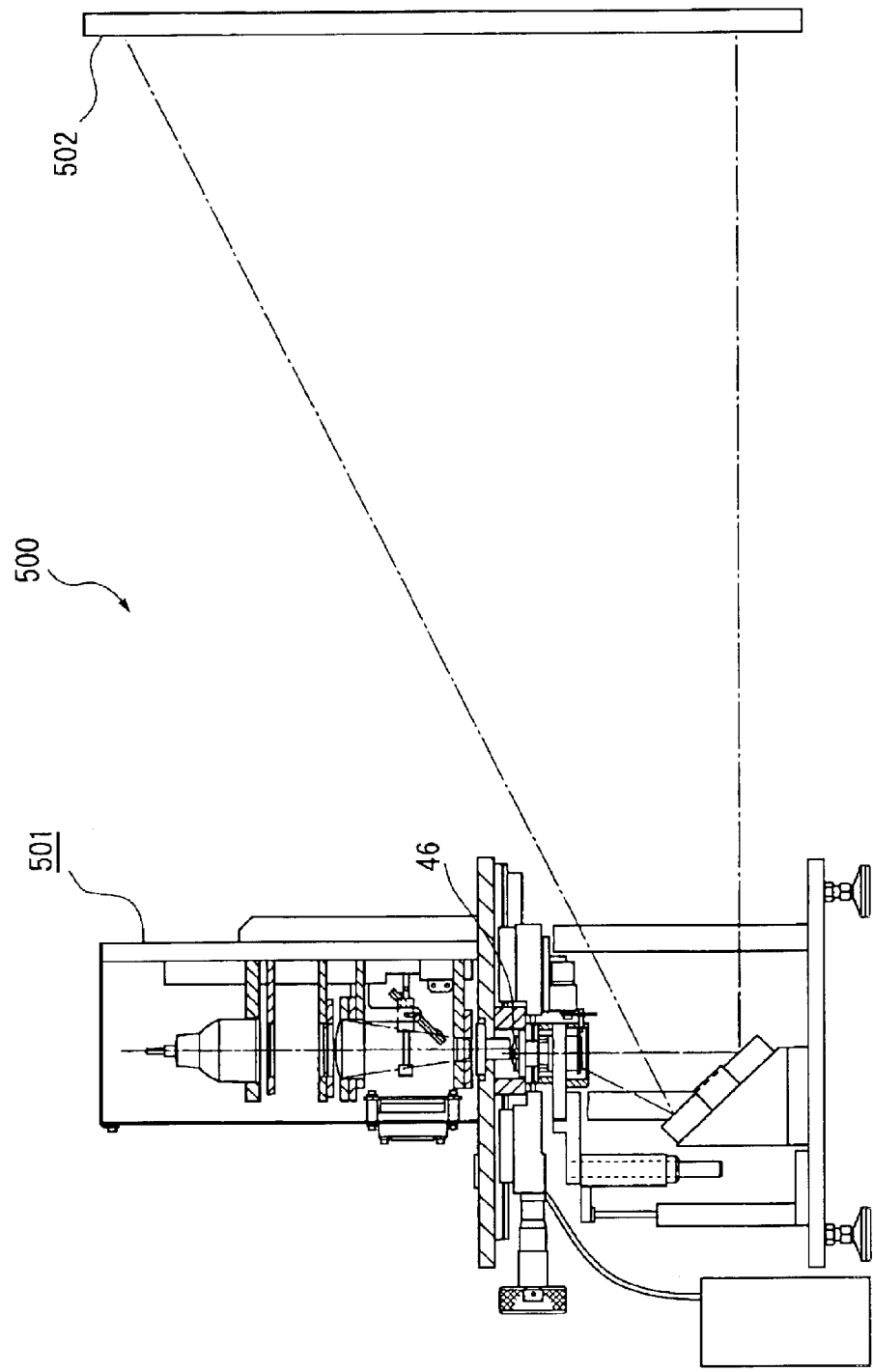
FIG. 11 is a side view showing a projection lens manufacturing apparatus for manufacturing the projection lens.

FIG. 11 is a side view showing a projection lens manufacturing apparatus 500.

The projection lens manufacturing apparatus 500 that manufactures the projection lens 46 used for the projector 1 includes, as shown in FIG. 11, an apparatus body 501 and a screen 502 on which the image irradiated by the apparatus body 501 is projected.

Figure 12:
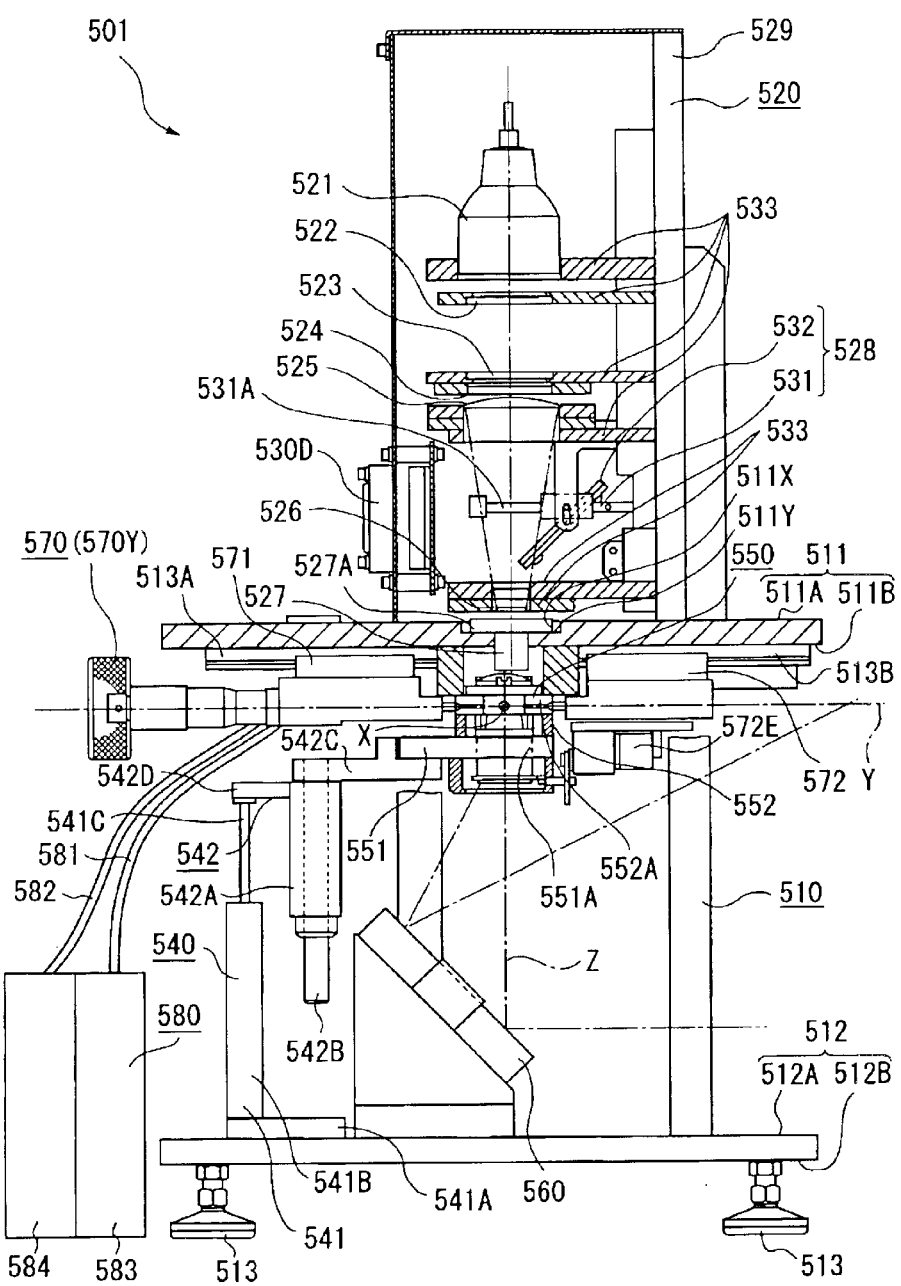
FIG. 12 is a side view showing an apparatus body of the projection lens manufacturing apparatus.
Figure 13:
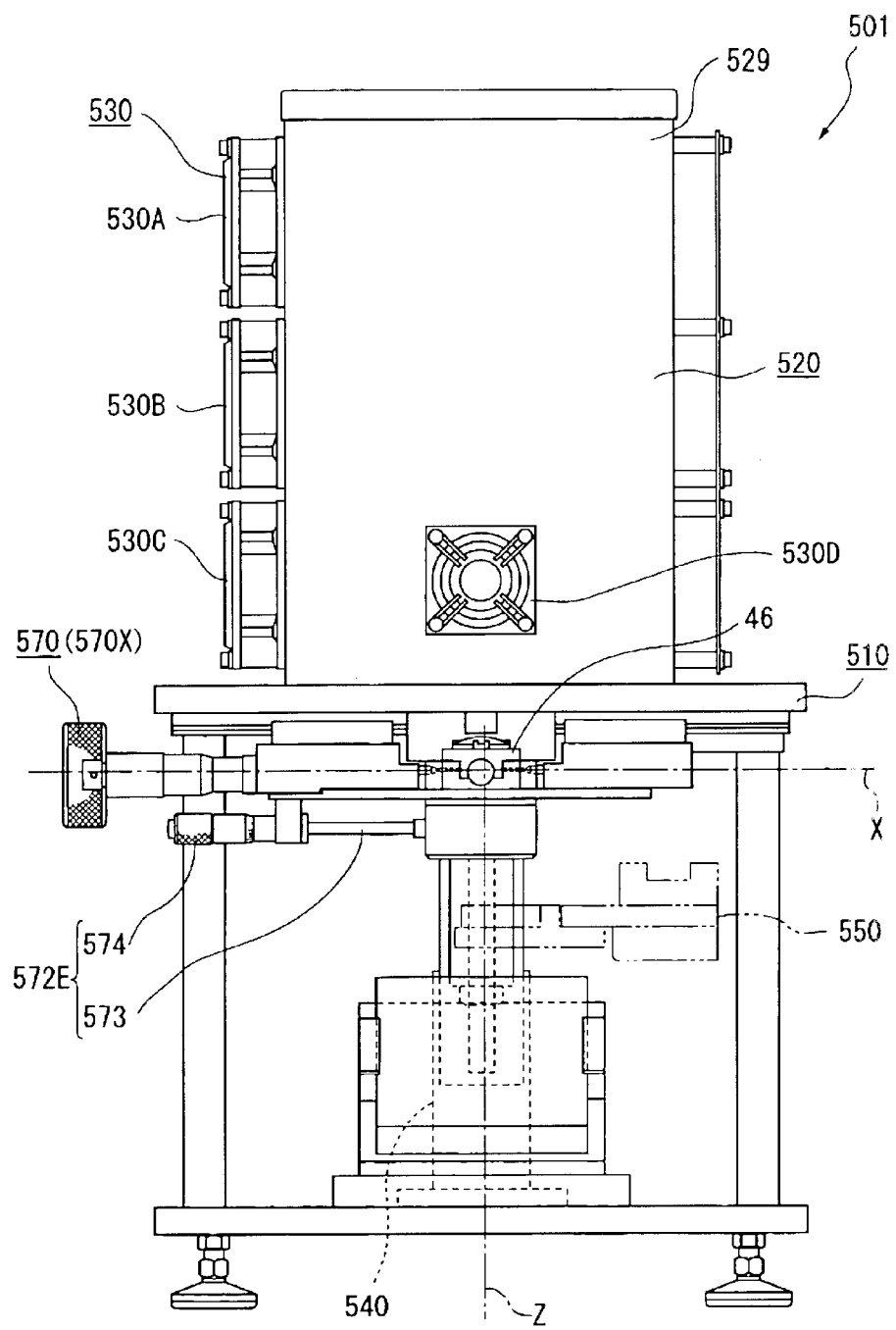
FIG. 13 is a schematic showing the apparatus body seen from rear side thereof.

FIG. 12 is a side view showing the apparatus body 501. FIG. 13 is an illustration showing the apparatus body 501 from rear side thereof. As shown in FIGS. 12 and 13, an X-Y coordinate is set as X-axis and Y-axis being orthogonal to each other and also orthogonal to the optical axis Z of the projection lens 46. The X-axis and the Y-axis are set in the direction in which below-described opposing pins advance and retract.

As shown in FIGS. 12 and 13, the apparatus body 501 is a component mainly for manufacturing the projection lens 46, which has a platform 510 having an upper stand 511 and a lower stand 512, a projecting portion 520 located on an upper surface 511A of the upper stand 511 of the platform 510, a drive mechanism 540 located on an upper surface 512A of the lower stand 512 of the platform 510, a projection lens holding mechanism 550 connected with the drive mechanism 540, a reflection mirror 560 as a reflection member located on the upper surface 512A of the lower stand 512 of the platform 510, a lens position adjuster 570 located on the side of the lower surface 511B of the upper stand 511 of the platform 510 and a bonding mechanism 580 (not entirely illustrated).

As shown in FIG. 12, the platform 510 is located on the floor or a desk etc. for supporting the respective components 520, 540, 560 and 570, which is constructed of two stages, i.e. the upper stand 511 and the lower stand 512.

An opening 511X for a light beam irradiated by a light source 521 to pass through is formed on the upper stand 511. A support surface 511Y for holding a part of the projecting portion 520 is formed around the opening 511X.

Four legs 513 (not entirely illustrated) are provided on the lower surface 512B of the lower stand 512. The four legs 513 abut to the floor etc. and support the apparatus body 501 at four points.

The projecting portion 520 is a device that irradiates an image light including predetermined test patterns to the projection lens 46, which has the light source 521, a first lens array 522, a second lens array 523, a polarizer 524, a superposing lens 525, a check sheet 526, a dummy prism 527, a light-shielding device 528, a casing 529 for housing the components 521 to 528, and a plurality of fans 530 provided on a side of the casing 529.

The light source 521 irradiates a test reference light beam, which includes a light source lamp and a parabolic reflector (not shown). The concave of the parabolic reflector is shaped in paraboloid of revolution, and the light source lamp is located adjacent to the focal point of the concave shaped in paraboloid of revolution. In such arrangement, the light beam irradiated by the light source lamp and reflected by the parabolic reflector is changed into an approximately parallel light beam and irradiated by the light source 521.

The first lens array 522 is the same as the first lens array 412 of the projector 1. The second lens array 523 is the same as the second lens array 413 of the projector 1. The polarizer 524 and the superposing lens 525 are the same as the polarizer 414 and the superposing lens 415. The components 522 to 525 respectively have the same functions as the components 412 to 415.

Figure 14:
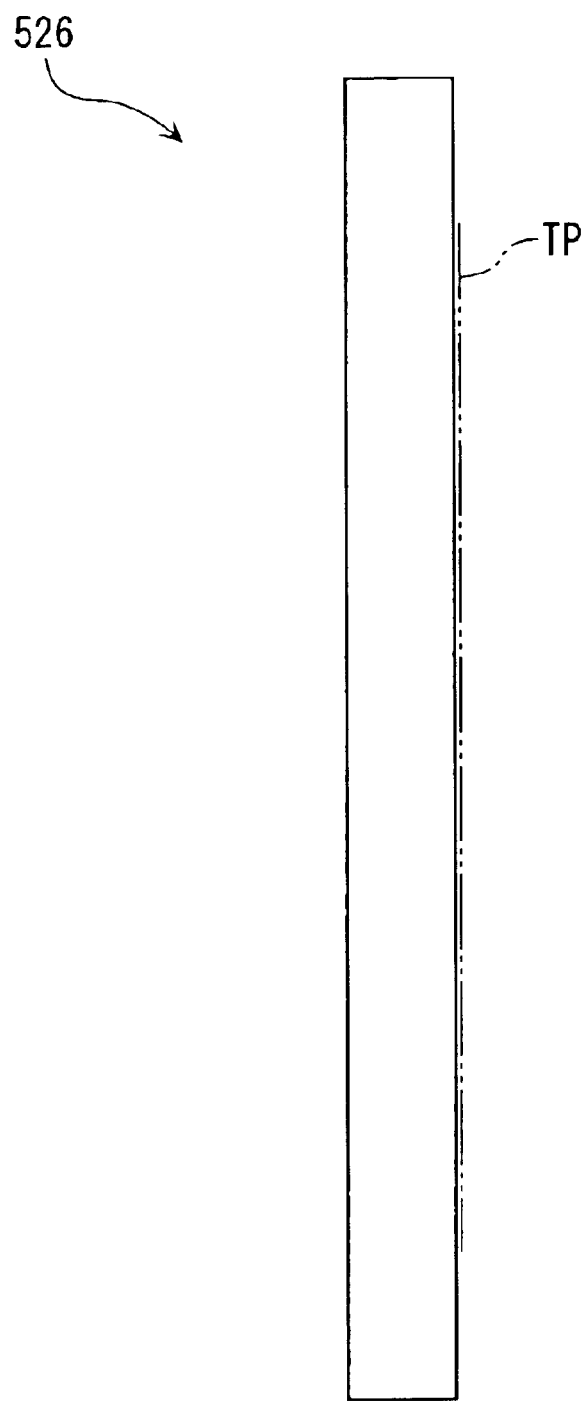
FIG. 14 is a side view showing a check sheet of the apparatus body.
Figure 15:
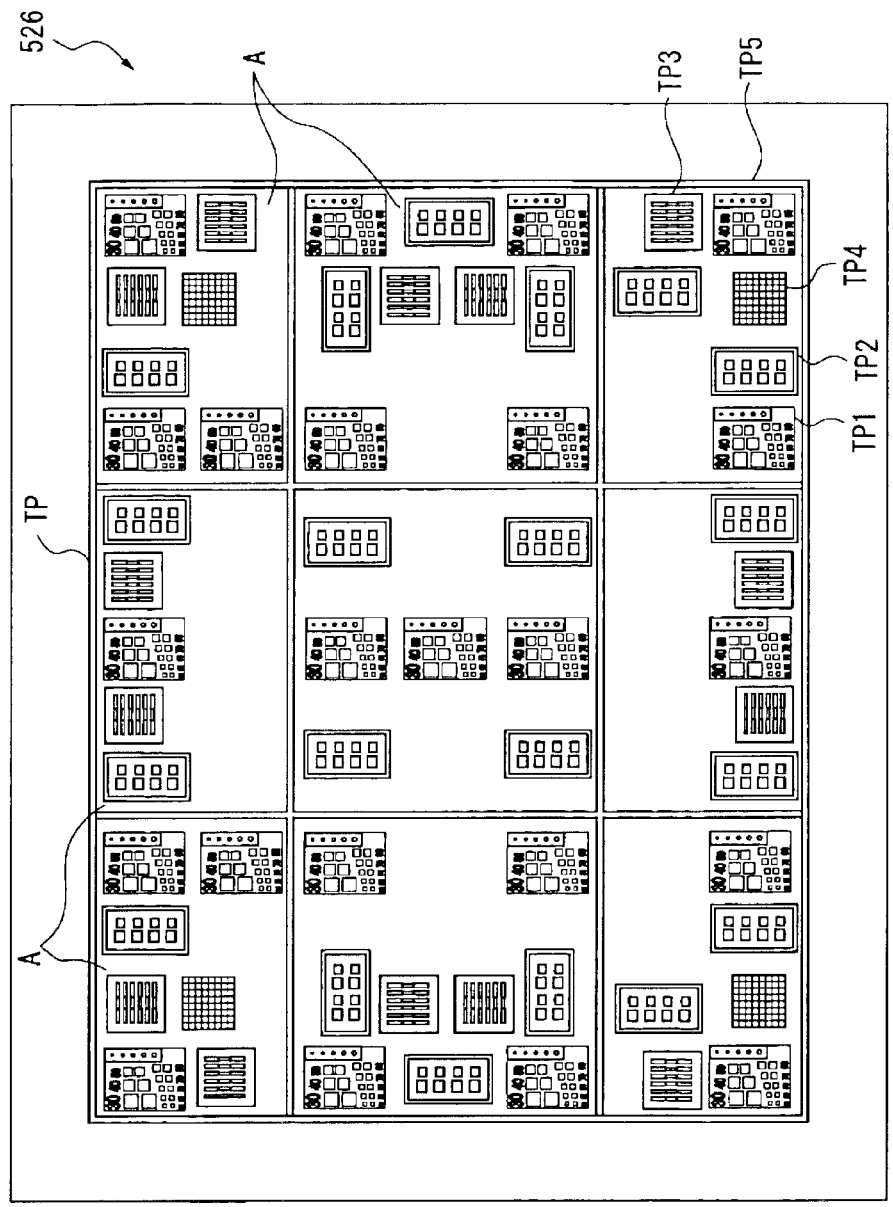
FIG. 15 is a front view showing the check sheet.
Figure 16:
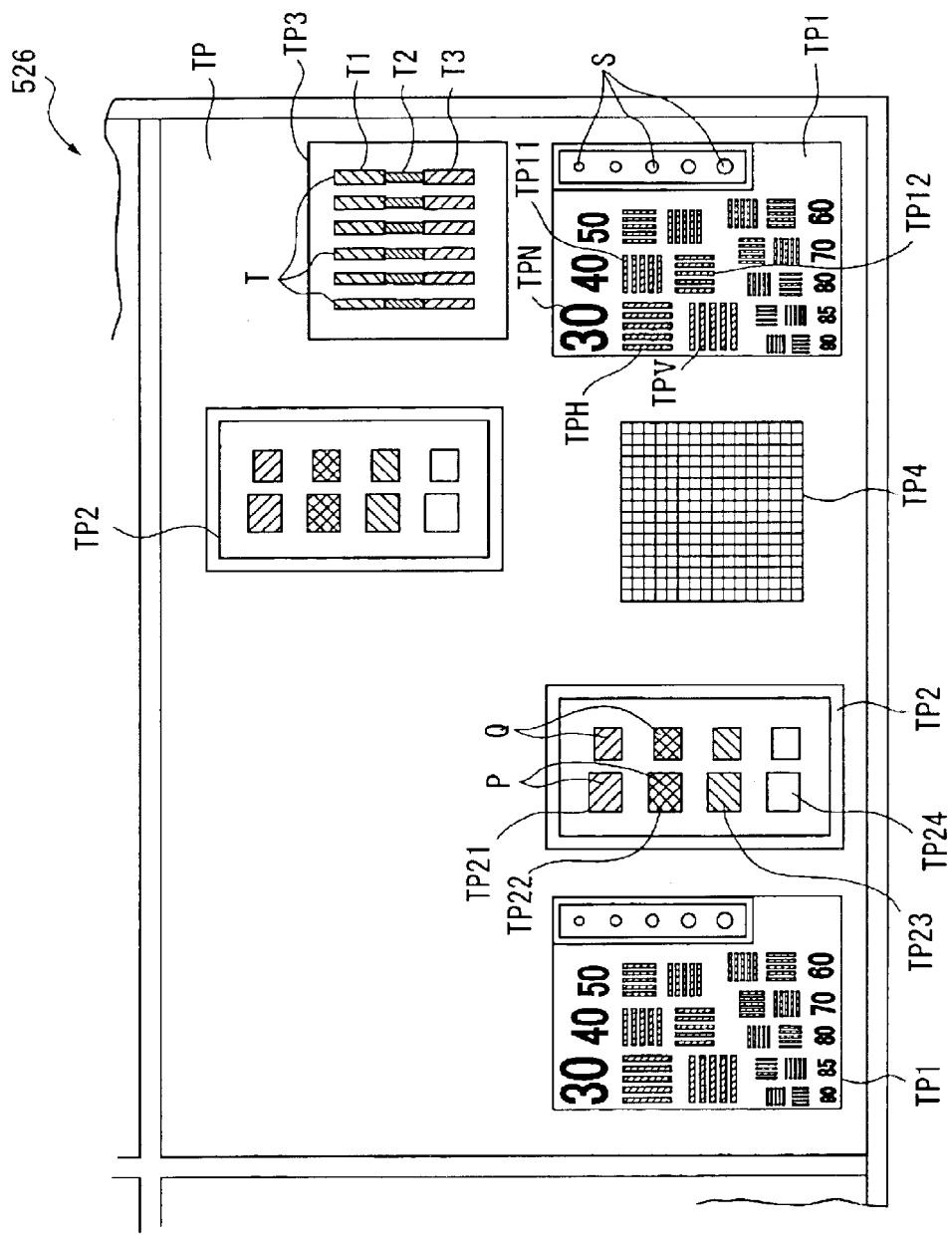
FIG. 16 is an enlarged front view showing a part of the check sheet.

FIG. 14 is a side elevational view showing the check sheet 526. FIG. 15 is a front elevational view showing the check sheet 526. FIG. 16 is an enlarged front elevational view showing a part of the check sheet 526.

The check sheet 526 is an image light irradiation portion that receives the light beam irradiated by the light source 521 to form a test pattern image for measuring resolution and color aberration etc. and irradiate the test pattern image on the projection lens 46.

As shown in FIG. 14, the check sheet 526 is made of a light-transmitting silica-glass having a predetermined thickness (e.g. 1.1 mm) as a base material with an image area (test pattern) TP being formed on the front side thereof. The base material has predetermined length and width (e.g. 13.0 mm×16.0 mm), and the rectangular image area (test pattern) TP with predetermined length and width (e.g. 8.4 mm×11.2 mm) is formed inside the base material.

As shown in FIG. 15, the test pattern TP is divided into nine sections to form nine measurement areas A each of which includes all or a part of a resolution measurement test pattern TP1, a flare measurement test pattern TP2, a color aberration measurement test pattern TP3, a focus adjustment test pattern TP4, and a spherical measurement test pattern TP5 as an outer circumference of the test pattern TP, the test pattern being arranged in longitudinal direction or transverse direction.

As shown in FIG. 16, the resolution measurement test pattern TP1 includes a pattern TP11 in which light-shielding areas TPV are horizontally arranged in stripes and a pattern TP12 in which light-shielding areas TPH are vertically arranged in stripes.

Numeric characters TPN are provided on the upper and lower sides of the patterns TP11 and TP12. The numeric characters TPN indicate spatial frequency of the patterns TP11 and TP12 provided on the upper side or the lower side. For instance, the patterns TP11 and TP12 provided below the "30" are the patterns with the spatial frequency of thirty lines/mm. The image light including the patterns TP11 and TP12 is projected on the screen by detecting the visually sensible spatial frequency to measure the resolution of the projection lens 46.

On the right side of the pattern TP11 and TP12 in the figure, different-sized five circular hole patterns S as the light-transmitting area are formed, and the flare can be determined based on the difference between the area of each hole S and the area of the image projected by the light passing through the hole S during automatic check.

The flare measurement test pattern TP2 is a rectangular light-shielding area with a predetermined dimension, in which four pairs TP21 to TP24 of rectangular light-transmitting areas P and Q with different size are formed.

In FIG. 16, a blue filter, a green filter, and a red filter are provided sequentially from the top on the pair of the light-transmitting areas P and Q TP21 to TP24, except for the lowermost pair TP24. The image light passing through the check sheet 526 is projected on the screen 502 as the image light in color of blue, green, red and white with the shapes corresponding to the light-transmitting areas P and Q, in which flare is measured by sharpness (blur) of the profile of the rectangular image light projected on the screen 502.

The color aberration measurement test pattern TP3 is a rectangular light-shielding area, in which six light-transmitting areas T shaped in approximately oblong rectangle including three rectangular areas T1 to T3 are formed. A step is formed in the center of each light-transmitting area T. The difference among the six light-transmitting areas is gradual variation of the size of each step, in other words, the width (the horizontal dimension in the drawing) of each of the rectangular areas T2. Red, green and blue filters are provided on the rectangular areas T1 to T3 from the upper side to the lower side in FIG. 16.

Accordingly, the image light passing through the check sheet 526 is projected on the screen 502 as the image light in color of red, green and blue with the shapes corresponding to the rectangular areas T1 to T3 so that color aberration is measured by sharpness (blurring) of the step between the red area and the blue area based on the green area.

The focus adjustment test pattern TP4 is a test pattern for adjusting the focus of the image light projected on the screen, and is provided on four corners of the test pattern TP.

Back to FIG. 12, the dummy prism 527 is a glass block having a shape corresponding to the cross dichroic prism 444 of the projector 1 in imitation of the cross dichroic prism 444. A fixing plate 527A is attached to an incident end of the dummy prism 527. The fixing plate 527A is supported by a support surface 511Y of the upper stand 511 of the platform 510. The dummy prism 527 attached to the fixing plate 527A is housed in the opening 511X of the upper stand 511.

As shown in FIG. 12, the light-shielding device 528 comprises a base 531 that has an opening 531A corresponding to the light beam irradiated by the superposing lens 525 and is fixed to the casing 529, and a light-shielding plate 532 that turns around an axis parallel to the X axis relative to the base 531. The light-shielding device 528 turns the light shield 532 to pass and block the light beam irradiated by the superposing lens 525.

The casing 529 is a light-shielding casing that prevents leakage of the light beam inside thereof, which is fixed to the upper surface 511A of the upper stand 511 of the platform 510 and is provided with holders 533 thereinside, the holders 533 respectively holding the components 521 to 526 on an optical path. Openings for letting the light beam pass through are provided in the holders 533.

As shown in FIG. 13, a plurality of fans 530 include three axial-flow fans 530A to 530C vertically arranged on the left lateral side (in the drawing) of the casing 529, and an axial-flow fan 530D provided on the front lower central portion (in the drawing) of the casing 529. The fans 530A to 530D prevent overheating of the interior of the casing 529.

A straight optical path linearly extending along an approximately vertical direction is set in the projecting portion 520. The light beam irradiated by the projecting portion 520 is approximately the same as the light beam when the projection lens 46 is used in the projector 1. Therefore, since the projection lens 46 can be manufactured under the similar conditions in which the projection lens is used in a projector, the projection lens 46 can meet the requirements for use.

The drive mechanism 540 moves the projection lens holding mechanism 550 between the position of the lens position adjuster 570 and the supplying position for supplying the projection lens 46 to be manufactured, which has a linear drive device 541 fixed to the upper surface 512A of the lower stand 512 of the platform 510 and a rotary drive deice 542 provided on the distal end of the linear drive device 541 as shown in FIG. 12.

The linear drive device 541 includes a base 541A fixed to the upper surface 512A of the lower stand 512 of the platform 510, a cylinder 541B attached to the upper surface of the base 541A, and a piston 541C provided on the cylinder 541B which advances and retracts along a direction parallel to the optical axis Z, i.e., approximately vertical direction. The linear drive device 541 moves the piston 541C by a predetermined distance along the direction parallel to the optical axis Z by air pressure inside the cylinder 541B to move the rotary drive device 542 linearly along the direction parallel to the optical axis Z.

The rotary drive device 542 includes a barrel 542A attached to the tip of the piston 541C through the connector 542D, a shaft 542B inserted into the barrel 542A, and an arm 542C attached to the tip of the shaft. As shown in FIG. 13 and below-described arrow in FIG. 17, the rotary drive device 542 rotates the arm 542C around the shaft 542B to move the projection lens holding mechanism 550 between the position on the illuminating optical axis of the optical path and the position off the illuminating optical axis.

The projection lens holding mechanism 550 holds a projection lens 46 to be manufactured at a lens adjusting position for adjusting the position of the third group lens 113 on the illuminating optical path. As shown in FIG. 12, the projection lens holding mechanism 550 includes a base 551 attached to the tip of the arm 542C and a holder 552 provided on the base.

The base 551 is a plate-shaped member for supporting the holder 552, which has an opening 551A for inserting the lens-barrel 100 of the projection lens 46 approximately at the center thereof. Four recesses are provided around the fitting recess at a regular interval.

The holder 552 is a jig for holding the projection lens 46 with the projection side thereof facing downward (in FIG. 12), which comprises a rectangular plate-shaped holder body 552A and four legs provided on four corners of the holder body 552A to be inserted into the four recesses. When in use, the holder 552 is exchanged in accordance with the type and dimension of the projection lens 46 to be manufactured.

A circular opening is formed approximately at the center of the holder body 552A. The lens-barrel 100 is inserted into the opening. A recess having a shape corresponding to the shape of the collar 121 of the projection lens 46 is formed around the opening. Accordingly, the collar 121 is fitted into the recess of the holder body 552A so that the projection lens 46 is held at an approximately correct position with reference to the profile thereof.

The reflection mirror 560 reflects to bend the optical path of the image light irradiated by the projection lens 46 with the predetermined test pattern incorporated therein by approximately 90° to project the image light on the screen.

The lens position adjuster 570 adjusts the position of the third group lens 113 of the projection lens 46 on the X-Y plane, which includes an X-direction lens adjuster 570X for adjusting the position along the X axis and a Y-direction lens adjuster 570Y for adjusting the position along the Y-axis. Since the X-direction and the Y-direction lens adjusters 570X 570Y are identically arranged, the same reference numerals are attached to the same components. The arrangement of the Y-direction lens adjuster 570Y will be described below and the explanation of the arrangement of the X-direction lens adjuster 570X will be omitted.

As shown in FIG. 12, the Y-direction lens adjuster 570Y includes a first cylinder device 571 and a second cylinder device 572 slidable along the Y-axis on sliders 513A and 513B provided on the lower surface 511B of the upper stand 511 of the platform 510. The cylinder devices 571 and 572 function as biasing portions.

Figure 17:
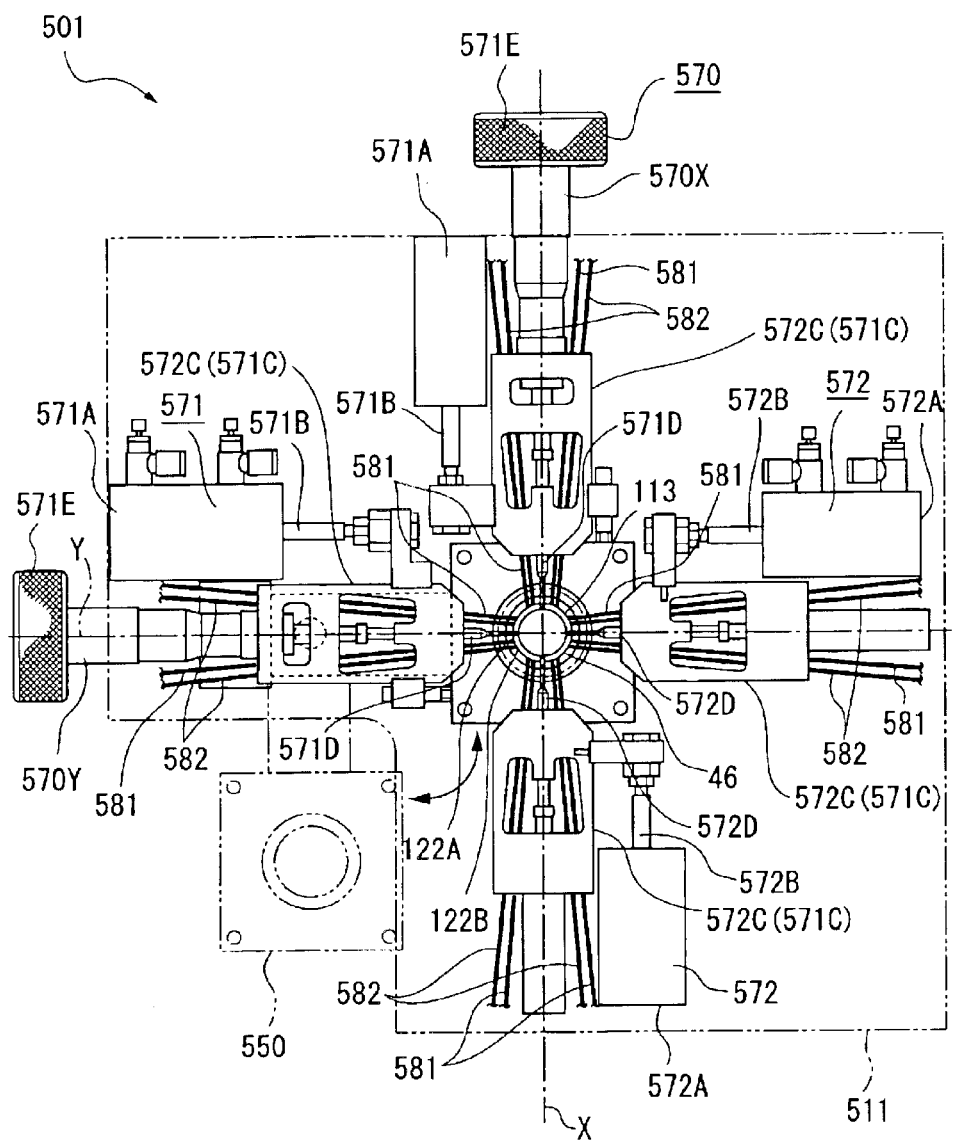
FIG. 17 is an enlarged plan view showing a part of a lens position adjuster and a bonding mechanism of the projection lens manufacturing apparatus.

FIG. 17 is an enlarged plan view showing a part of the lens position adjuster and the bonding mechanism.

As shown in FIGS. 12 and 17, the first cylinder device 571 includes a cylinder 571A attached to the slider 513A, a piston 571B attached to the cylinder 571A, a box 571C attached to the tip of the piston 571B, a first pin 571D attached to the inside of the box 571C, and a micrometer head 571E as an advancement/retraction portion for finely adjusting the advancement and retraction of the first pin 571 in the direction along the Y-axis.

The cylinder 571A advances and retracts the piston 571 relative to the projection lens 46 along the Y-axis in accordance with the pressure level of the air pumped into the inside thereof.

The piston 571B advances and retracts in accordance with the air pressure of the inside of the cylinder 571A to advance and retract the box 571C along the Y-axis.

As shown in FIG. 17, the first pin 571D is inserted into the position adjusting hole 122A of the projection lens 46 to adjust the position of the third group lens 113 of the projection lens 46 in Y-direction. The tip of the first pin 571D abuts to the outer circumference of the third group lens 113, which is polished not to damage the third group lens 113.

The micrometer head 571E can finely adjust the advancement and the retraction of the pin 571D with resolution of 1 $\mu$m.

As shown in FIGS. 12 and 17, the second cylinder device 572 includes a cylinder 572A attached to the slider 513B, a piston 572B attached to the cylinder 572A, a box 572C attached to the tip of the piston 572B, a second pin 572D attached to the inside of the box 572C, and a focus adjuster 572E attached to the lower side of the box 572C.

The second cylinder device 572 is different from the first cylinder device 571 in that the second cylinder device 572 includes the focus adjuster 572E instead of the micrometer head 571E and has approximately the same arrangements in the other parts.

The cylinder 572A advances and retracts the piston 572B relative to the projection lens 46 along the Y-axis in accordance with the pressure level of the air pumped into the inside thereof. The piston 572B is the same component as the piston 571B. The box 572C and the second pin 572D are respectively the same as the box 571C and the pin 571D.

The air pressure in the cylinder 571A of the first cylinder device 571 is higher than the air pressure in the cylinder 572A of the second cylinder device 572. Therefore, when the first pin 571D of the first cylinder device 571 advances toward the second pin 572D, the second pin 572D of the second cylinder device 572 retracts away from the first pin 571D. Conversely, when the first pin 571D of the first cylinder device 571 retracts from the second pin 572D, the second pin 572D of the second cylinder device 572 advances toward the first pin 571D.

Accordingly, since both ends of the third group lens 113 of the projection lens 46 on the Y-axis corresponding to the position-adjusting holes 122A are in contact with the polished tips of the pins 571D and 572D, the third group lens 113 is constantly sandwiched and held by the pins. Therefore, when the pin 571D advances and retracts along the Y-axis, the third group lens 113 also advances and retracts in the lens-barrel body 101.

Incidentally, relative to the first pin 571D and the second pin 572D respectively located in X-direction, the third group lens 113 moves along the Y-direction between the polished tips of the pins 571D and 572D.

As shown in FIG. 13, the focus adjuster 572E includes a rod 573 abutting on the front frame 102 of the projection lens 46 located at the lens adjusting position and a micrometer 574 for advancing and retracting the rod 573. In the focus adjuster 572E, the micrometer 574 is operated to rotate the front frame 102 by the rod 573, thereby adjusting the focus of the projection lens 46

The X-direction lens adjuster 570X has approximately the same arrangements, effects and functions as the Y-direction lens adjuster 570Y and is different from the Y-direction lens adjuster 570Y only in that the X-direction lens adjuster 570X does not include the focus adjuster 572E. Therefore, the X-direction lens adjuster 570X adjusts the position of the third group lens 113 in the lens-barrel 101 in the direction along the X-axis.

Incidentally, relative to the first pin 571D and the second pin 572D respectively located in Y-direction, the third group lens 113 moves along the X-direction between the polished tips of the pin 571D and 572D in the same manner as in adjustment in Y-direction.

As shown in FIGS. 12 and 17, the bonding mechanism 580 bonds and fixes the third group lens 113 to the lens-barrel body 101, which includes eight adhesive-injecting tubes 581 located on both sides of the pins 571D and 572D and respectively inserted into the corresponding adhesive injection holes 122B, ultraviolet irradiation fibers 582 for irradiating ultraviolet to an ultraviolet-curing adhesive injected in the injection holes 122B, adhesive-injecting portions 583 for injecting ultraviolet-curing adhesive connected to the adhesive-injecting tubes 581, and an ultraviolet irradiator (light beam irradiator) 584 connected to the ultraviolet irradiation fibers 582. The adhesive-injecting tubes 581 and the ultraviolet irradiation fibers 582 are partly housed in the boxes 571C and 572C.

In the bonding mechanism 580, after injecting the ultraviolet-curing adhesive from the adhesive-injecting portions 583 to the adhesive injection holes 122B through the adhesive-injecting tubes 581, the ultraviolet is irradiated by the ultraviolet irradiator 584 through the ultraviolet irradiation fibers 582 to bond and fix the third group lens 113 to a predetermined position on the lens-barrel body 101 at eight points. In other words, according to the present exemplary embodiment, the injection of ultraviolet-curing adhesive into injection holes 122B and the irradiation of the ultraviolet to the ultraviolet-curing adhesive are successively conducted, and the injection of the adhesive as well as the irradiation of the ultraviolet are automated.

Incidentally, when the ultraviolet is irradiated, the adhesive-injecting tubes 581 are retracted from the position in injecting the adhesive for preventing the ultraviolet from being irradiated to the adhesive inside of the adhesive-injecting tubes 581.

Projection Lens Manufacturing Method

Figure 18:
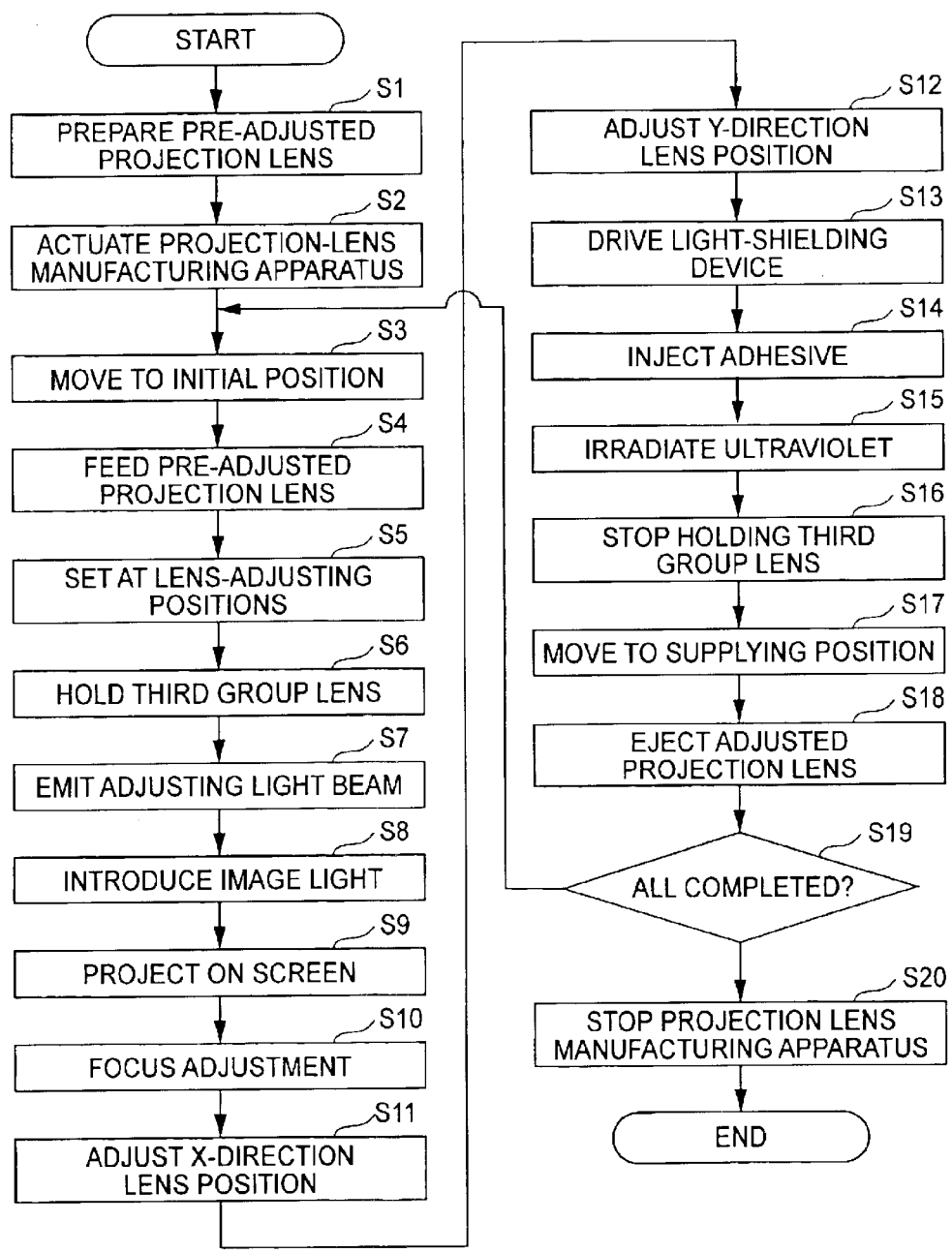
FIG. 18 is a flowchart showing steps for manufacturing the projection lens.

The projection lens 46 is manufactured in accordance with the flowchart shown in FIG. 18.

The pre-adjusted projection lens 46 in which only the third group lens 113 is loosely fitted and other group lenses 111, 112, and 114 are fixed with reference to the profile thereof is prepared (Step S1).

The projection lens manufacturing apparatus 500 is actuated (Step S2), and the respective components are moved to the initial positions (Step S3). Specifically, the projection lens holding mechanism 550 is located at the supplying position off the illuminating optical axis at the initial position thereof. The light shield 532 of the light-shielding device 528 is located outside the optical path at the initial position thereof.

In the projection lens holding mechanism 550 located at the supplying position thereof, the collar 121 of the pre-adjusted projection lens 46 is accurately fitted in the recess formed on the holder 552 of the projection lens holding mechanism 550 with reference to the profile thereof and the holder 552 is attached to the base 551 so that the pre-adjusted projection lens 46 is held by the projection lens holding mechanism 550 (Step S4).

After supplying the pre-adjusted projection lens 46, the drive mechanism 540 is actuated. When the drive mechanism 540 is driven, the projection lens holding mechanism 550 is moved vertically upward by the linear drive mechanism 541 and simultaneously rotated around an axis along the optical axis Z by the rotary drive mechanism 542. Then, the pre-adjusted projection lens 46 is held at the lens adjusting position on the illuminating optical axis (Step S5: Projection Lens Holding Step).

Figure 19A:
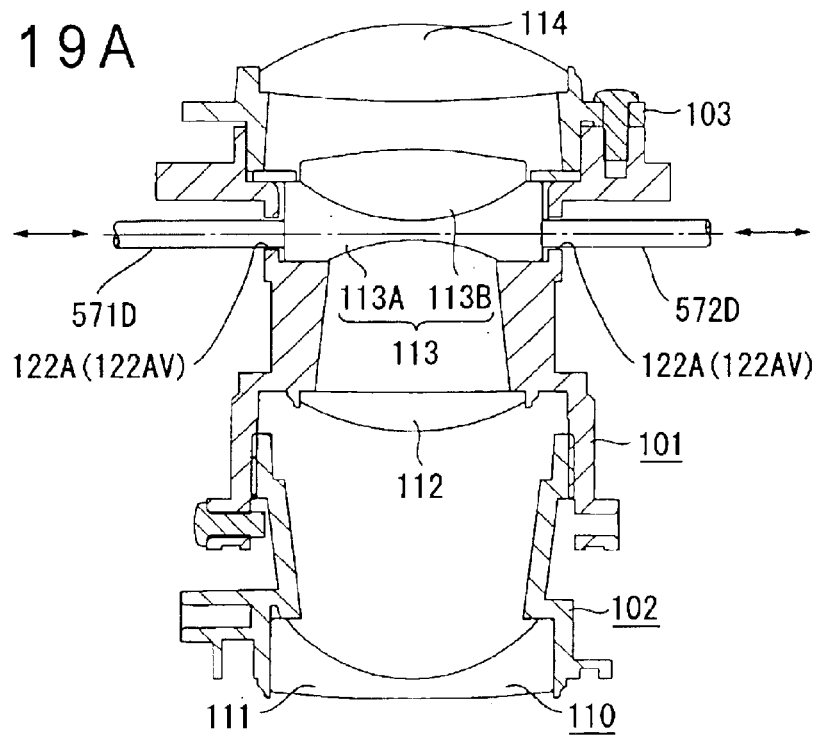
FIGS. 19(A) and 19 (B) are schematics showing a third group lens of the projection lens held by pins.
Figure 19B:
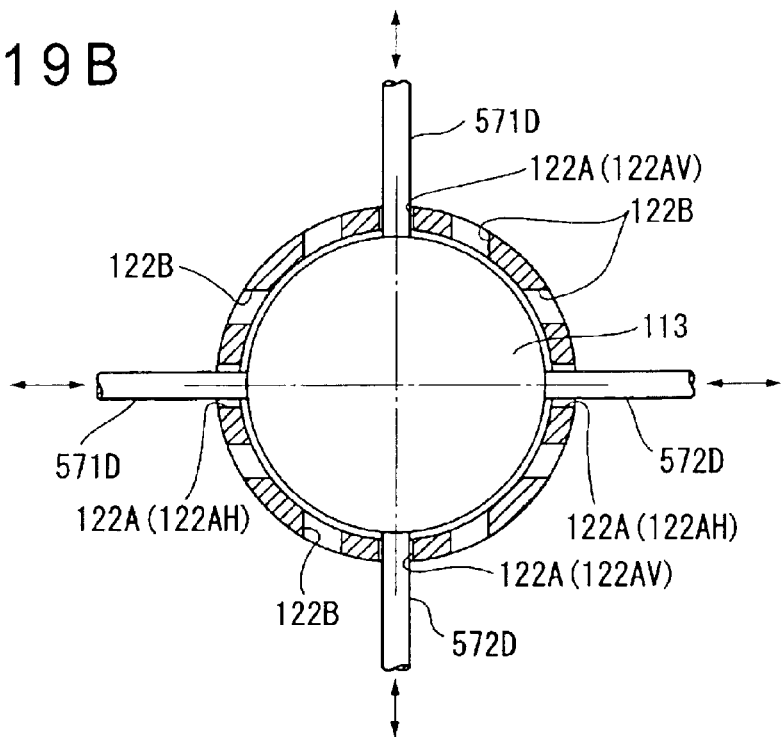

After setting the projection lens 46 at the lens adjusting position, the first and the second cylinder devices 571 and 572 are driven. The air pressure inside the cylinders 571A and 572A is increased to a predetermined level to move the first and the second pins 571D and 572D of the lens position adjuster 570 toward each other so that the first and the second pins 571D and 572D are inserted into the respective position-adjusting holes 122A as shown in FIGS. 19(A) and 19(B). The outer circumference of the third group lens 113 is held by the polished tips of the four pins 571D and 572D at four points (Step S6). While the first and the second pins 571D and 572D are moved toward each other, the adhesive-injecting tubes 581 of the bonding mechanism 580 are moved close to the adhesive injection holes 122B of the projection lens 46.

Incidentally, the air pressure inside the cylinders 571A and 572A is pre-set so as to approximately align the centers of the group lenses 111 to 114 by the tips of the respective pins 571D and 572D.

In the above-described conditions, the projecting portion 520 is actuated. The adjustment light beam is irradiated by the light source 521 (Step S7: Light Beam Irradiation Step) and transformed into an image light including a predetermined test pattern TP in passing through the check sheet 526 through the respective optical components, and the image light including the test pattern TP is received by the pre-adjusted projection lens 46 through the dummy prism 527 (Step S8: Image Light Irradiation Step). The received image light including the test pattern TP is bent forward by 90° by the reflection mirror to be projected on the screen 502 in an enlarged manner (Step S9).

While observing the projected image light including the test pattern TP on the screen 502, the focus of the image light on the screen 502 is adjusted (Step S10). Specifically, while the test pattern TP4 of the projected image light is observed, the focus of the projected image is adjusted by operating the micrometer 574 of the focus adjuster 572E to advance and retract the rod 573 for rotating the front frame 102 relative to the lens-barrel body 101.

Then, while observing the projected image on the screen 502, the position of the third group lens 113 is adjusted independently in X-direction and Y-direction by operating the lens position adjuster 570 for optimizing (sharpening) the respective test patterns TP1 to TP3 and for minimizing the flare and the like.

More specifically, the micrometer head 571E of the X-direction lens adjuster 570X is operated to advance and retract the first pin 571D relative to the second pin 572D, the pins 571D and 572D being inserted into the pair of the position-adjusting holes 122A on the X-axis, so that the position in X-direction is finely adjusted by hand (Step S11: Lens Position Adjustment Step).

In the same manner, the micrometer head 571E of the Y-direction lens adjuster 570Y is operated and the position of the third group lens 113 in Y-direction is adjusted by hand (Step S12: Lens Position Adjustment Step). Accordingly, the positions of the center of the plurality of group lenses 111 to 114 are accurately aligned.

After adjusting the position of the third group lens 113, the light-shielding device 528 is actuated (Step S13). The light-shielding device 528 locates the light shield 532 on the optical path so as to prevent the light beam irradiated by the light source 521 from being introduced into the projection lens 46.

Then, the bonding mechanism 580 is driven. With the third group lens 113 being held by the four pins 571D and 572D at four points, the respective adhesive-injecting tubes 581 of the bonding mechanism 580 are inserted into the eight adhesive injection holes 122B and the fluid ultraviolet-curing adhesive is injected from the adhesive-injecting portions 583 (Step S14: Bonding Step). After injecting the ultraviolet-curing adhesive, the adhesive-injecting tubes 581 of the bonding mechanism 580 are pulled out from the adhesive injection holes 122B.

Thereafter, the ultraviolet is irradiated by the ultraviolet irradiator 584 to the injected ultraviolet-curing adhesive through the ultraviolet irradiation fibers 582 (Step S15: Bonding Step), so that the third group lens 113 is bonded to the lens-barrel body 101.

When the bonding is completed, the air pressure inside the cylinders 571A and 572A of the first and the second cylinder devices 571 and 572 is reduced to move the pistons 571B, 572B away from each other and the first and the second pins 571D and 572D are pulled out of the position-adjusting holes 122A so that the third group lens 113 is released (Step S16).

The projection lens holding mechanism 550 holding the bonded projection lens 46 is moved from the lens adjusting position on the illuminating optical axis to the supplying position off the illuminating optical axis (Step S17). The adjusted projection lens 46 at the supplying position is removed from the projection lens holding mechanism 550 to complete the manufacturing process of the projection lens 46 (Step S18).

After removing the manufactured projection lens 46, another pre-adjusted projection lens 46 is provided on the projection lens holding mechanism 550 as described above, and the projection lens 46 is successively manufactured in the same manner (Step S19). Finally, the projection lens manufacturing apparatus 500 is powered off to terminate manufacturing process (Step S20).

Advantages of Embodiment

According to the above exemplary embodiment, the following advantages can be obtained.

(1-1) Since the lens position adjuster 570 for X-direction and Y-direction is provided and the above-described manufacturing steps are applied, the position of the third group lens 113 of the projection lens 46 can be adjusted with high accuracy independently in X-direction and Y-direction orthogonal to each other. Therefore, the direction to be adjusted can be easily recognized as compared to the related art arrangement where the third group lens is adjusted in three directions, thereby facilitating the adjustment work.

(1-2) Since the third group lens 113 is held being sandwiched by the two pins 571D and 572D inserted into the facing position-adjusting holes 122A on X-axis, the position of the third group lens 113 in X-direction can be easily adjusted. In the same manner, the position in Y-direction can be easily adjusted as well.

(1-3) Since a pair of position-adjusting holes 122A are respectively provided along the X-axis and the Y-axis and the pins 571D and 572D are linearly inserted into the pair of the position-adjusting holes 122A to be advanced and retracted, it is not necessary to enlarge the size of the opening of the position-adjusting holes 112A as in a related art arrangement, thereby providing a projection lens 46 which can prevent light leakage and project an appropriate image.

(1-4) Since the pins 571D and 572D are provided on the side of the projection lens manufacturing apparatus 500 instead of the side of projection lens 46, i.e., the side of the projector 1, the number of components of the projection lens 46 can be reduced, thereby reducing manufacturing cost, size and weight of the projection lens 46.

(1-5) In the projection lens manufacturing apparatus 500, since the third group lens 113 is moved instead of the lens-barrel body 101, the optical axes of the fourth group lens 114 and the second group lens 112 fixed to the lens-barrel body 101 are not shifted relative to the adjustment light source 521. Therefore, the axes of the fourth group lens 114, the second group lens 112 and the third group lens 113 can be easily aligned, thereby adjusting the position of the optical axis of the third group lens 113 with high accuracy.

(1-6) Since the third group lens 113 is bonded to the lens-barrel body 101 after the position thereof being adjusted, the lens-barrel body 101 is not distorted by adjusting the position of the third group lens 113. Therefore, since there is no need to provide a distortion absorber for absorbing the distortion on the lens-barrel body 101, the size of the lens-barrel body 101 and the projection lens 46 can be reduced. Further, since the lens-barrel body 101 is not distorted, there is no need to heat the lens-barrel body 101 for removing the distortion. Accordingly, a heat-sensitive material may be used for the lenses 112 to 113 of the projection lens, so that the lens material is not limited. Additionally, since the position of the third group lens 113 is adjusted before being bonded to the lens-barrel body 101 and the third group lens is not fixed at the time of adjustment, the position of the optical axis of the third group lens 113 can be finely adjusted with ease and with high accuracy.

(1-7) Since the micrometer head 571E with high resolution of 1 $\mu$m level is used, the accuracy for adjusting the positions of optical axes of the group lenses 111 to 115 can be further improved.

(1-8) Since the air pressure inside the cylinders 571A and 572A of the first and the second cylinder devices 571 and 572 is always kept at a predetermined level, the position of the pins 571D and 572D is always kept constant. Therefore, when a projection lens 46 is exchanged to produce another projection lens 46, the center of the third group lens 113 to be adjusted can be approximately aligned relative to the centers of other group lenses 111, 112 and 114 and only fine adjustment of the deviation of each projection lens 46 is required, thereby speeding up and facilitating the position adjustment work.

(1-9) Since the drive mechanism 540 is provided, the projection lens holding mechanism 550 can move between the lens adjusting position on the illuminating optical axis and then supplying position off the illuminating optical axis, it is easy to set the projection lens 46 and possible to promote efficiency of manufacture process.

(1-10) Since the third group lens 113 can be bonded to the lens-barrel body 101 by the bonding mechanism 580 while being held by the lens position adjuster 570, defects caused during bonding process can be minimized.

(1-11) Since the light shielding device 528 is provided, the light beam irradiated by the light source 521 is not introduced into the projection lens 46 during bonding process, thereby preventing the ultraviolet-curing adhesive from being cured by mistake.

(1-12) Since the reflection mirror 560 reflects the image light irradiated by the projection lens 46 by approximately 90° to project on the screen, the direction of the optical path of the apparatus body 501 and the surface of the screen 502 are arranged approximately parallel parallel. Therefore, the size of the apparatus body 501 can be reduced as compared to an arrangement in which a straight optical path is formed between the light source 521 and the screen 502 along the vertical direction.

(1-13) Since the position of the projection lens 46 is adjusted while the enlarged image projected on the screen 502 is observed, the position of the optical axes of the group lenses 111 to 114 can be accurately adjusted.

(1-14) Since the optical path from the projecting portion 520 to the projection lens 46 is vertically arranged and the X-axis and the Y-axis are horizontally arranged, even when the adhesive remains in the adhesive-injecting tubes 581, the adhesive will not flow toward the pins 571D and 572D, so that the adhesion of the adhesive to the tips of the pins 571D and 572D can be prevented, thereby efficiently manufacturing the projection lens 46.

(1-15) Since the bonding mechanism 580 includes the adhesive-injecting portions 583 and the adhesive-injecting tubes 581 and the ultraviolet irradiator 584 and the ultraviolet irradiation fibers 582, the injection of ultraviolet-curing adhesive into injection holes 122b is followed by the irradiation of the ultraviolet to the ultraviolet-curing adhesive, and the injection of the adhesive and the irradiation of the ultraviolet are automated, the third group lens 113 can be easily bonded.

(1-16) As described above, a projection lens 46 capable of adjusting the position of the optical axis with high accuracy to project a high quality image and reducing production cost can be provided. When such projection lens 46 is provided in a projector 1, manufacturing cost, size and weight thereof can be reduced.

2. Second Exemplary Embodiment

Figure 20:
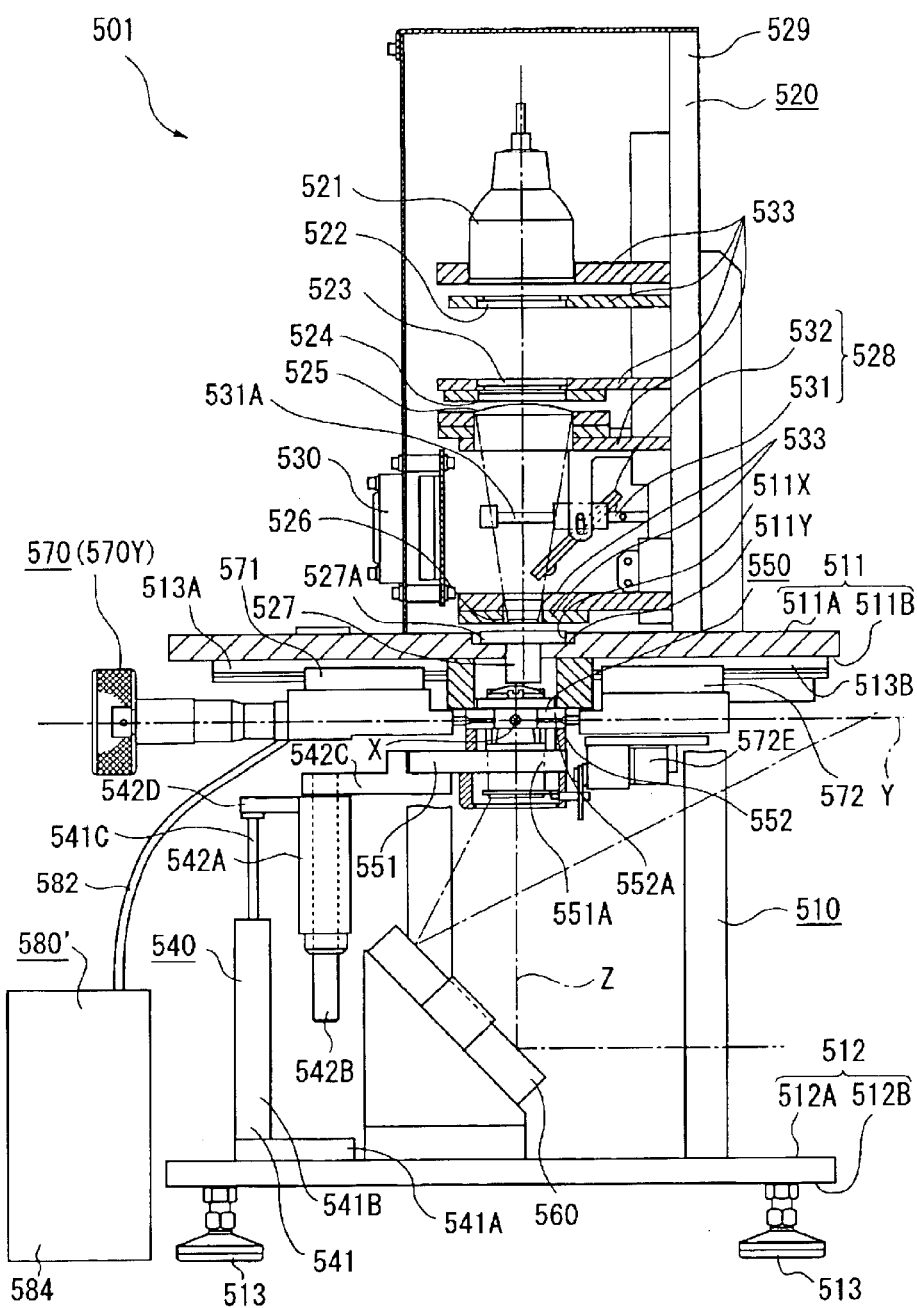
FIG. 20 is a side view showing a projection lens manufacturing apparatus according to a second exemplary embodiment of the present invention.

A second exemplary embodiment of the present invention will be described below with reference to FIGS. 20 and 21. Incidentally, the same reference numerals will be attached to the components identical with the components which have been described above to omit description thereof.

In the above-described exemplary embodiment, the bonding mechanism 580 includes the adhesive-injecting portions 583, the adhesive-injecting tubes 581, the ultraviolet irradiation fibers 582 and the ultraviolet irradiator 584, and the injection of the ultraviolet curing adhesive and the irradiation of the ultraviolet are automated. On the other hand, a bonding mechanism 580' according to the present exemplary embodiment does not have the adhesive-injecting portions and the adhesive-injecting tubes as shown in FIG. 20, and the adhesive is manually injected. In other words, the bonding mechanism 580' according to the present exemplary embodiment includes the ultraviolet irradiation fibers 582 and the ultraviolet irradiator (light beam irradiator) 584 connected to the ultraviolet irradiation fibers 582.

Figure 21A:
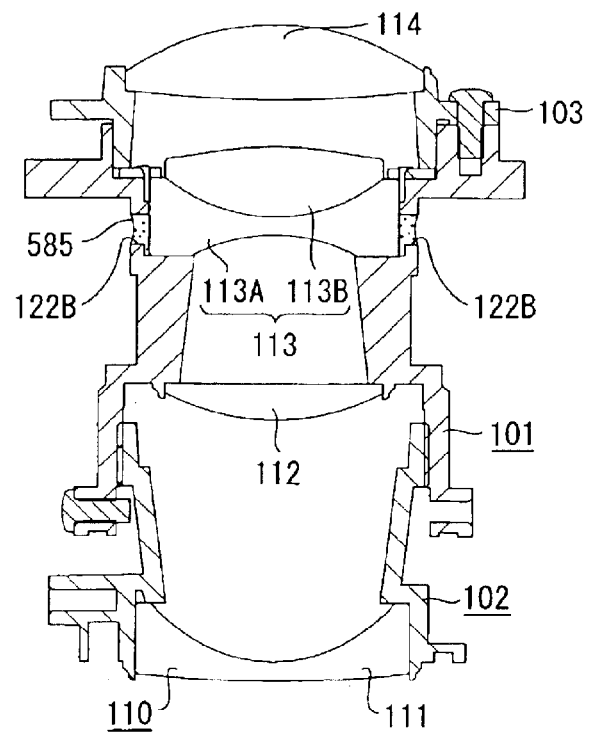
FIG. 21(A) is a schematic showing injection holes of a lens holding barrel of the projection lens with adhesive being injected.

According to the present exemplary embodiment, though the projection lens 46 is manufactured in a manner approximately the same as the above described exemplary embodiment (see FIG. 18), the present exemplary embodiment is different from the above-described exemplary embodiment in that the injection of the ultraviolet-curing adhesive 585 into the adhesive injection holes 122B as in FIG. 21(A) is manually conducted (Step S14 shown in FIG. 18).

Incidentally, at this time, the projection lens 46 may be removed from the projection lens holding mechanism 550 to inject the ultraviolet-curing adhesive 585, and the projection lens 46 may be set back to the projection lens holding mechanism 550. In this manner, the ultraviolet-curing adhesive 585 can be easily injected into the adhesive injection holes 122B. Since the projection lens manufacturing apparatus 500 memorizes the adjustment position of the third group lens 113, there is no need to adjust the position of the third group lens 113 again even when the projection lens 46 is attached after the projection lens 46 being removed from the projection lens holding mechanism 550. Further, even when the position thereof is adjusted again, only a fine adjustment which can be finished in short time is required and the ultraviolet-curing adhesive is not cured during the adjustment work.

Figure 21B:
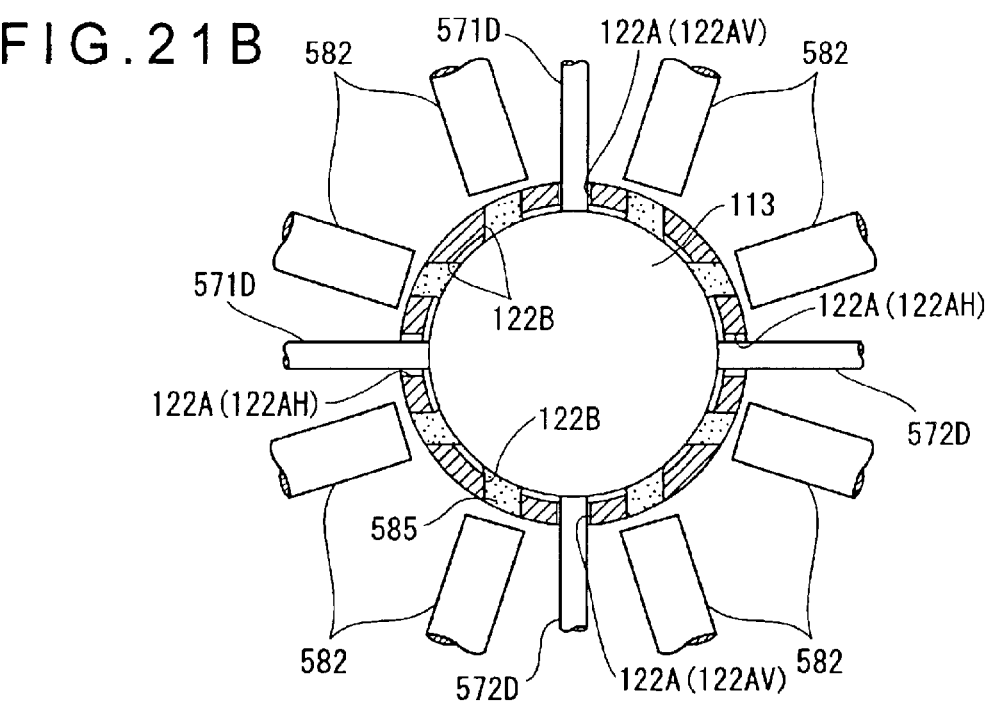
FIG. 21(B) is a schematic showing the adhesive injected into the injection holes being cured.

As shown in FIG. 21(B), ultraviolet is irradiated by the ultraviolet irradiator 584 to the injected ultraviolet-curing adhesive 585 through the ultraviolet irradiation fibers 582 (step S15 shown in FIG. 18).

According to the above-described second exemplary embodiment, the following advantage as well as the advantages approximately the same as (1-1) to (1-13) and (1-16) in the first embodiment can be obtained.

(2-1) According to the present exemplary embodiment, since the ultraviolet-curing adhesive 585 is manually injected to the injection holes 122B and the bonding mechanism 580' has no adhesive-injecting portions and adhesive-injecting tubes, the bonding mechanism 580' and the projection lens manufacturing apparatus 500 can be simplified.

3. Modification of Embodiments

Incidentally, the scope of the present invention is not restricted to the above specific exemplary embodiments, but includes modifications and improvements as long as an object of the present invention can be attained, which includes the modifications described below.

For instance, though the position of the lens is adjusted by a user by operating the respective mechanisms in the above-described embodiments, the position may be automatically adjusted under computer control. In such case, for instance, an image projected on the screen and the like may be picked up by an image pickup device such as a CCD camera and processed by a computer for adjusting the lens position. Alternatively, the image may be directly picked up by the pickup device such as a CCD camera without projecting the image on a screen.

Not only adjustment of optical axis position of a lens but also the entire process from supply to the ejection of the lens may be automated.

Though the cylinder device that biases the pins toward the projection lens by air pressure is used as the biasing portion in the above-described exemplary embodiments, the arrangement of the present invention is not restricted thereto. Specifically, various biasing portions may be used, which include an elastic member such as a spring, e.g. a plate spring and a coil spring, rubber and the like, or an electromagnetic biasing means. Further, though air is used as fluid in the above described exemplary embodiments, any fluid including gases other than air and liquids such as oil may be used.

Though four position-adjusting holes 122A and eight adhesive injecting holes 122B are provided in the above exemplary embodiments, the number of the respective holes is not restricted thereto, but less than four position-adjusting holes or more than eight adhesive injecting holes may be provided. The shape of the holes is not restricted, which can be designed in accordance with the diameter of the pins.

Though the ultraviolet-curing adhesive is used as an adhesive in the above-described exemplary embodiments, the adhesive is not restricted thereto, but other adhesives such as so-called instant adhesive may be used.

Though the projector having three optical modulators is used in the above-described exemplary embodiments, the arrangement is not limited thereto. For instance, a projector having only one optical modulator, a projector having two optical modulators, or a projector having more than four optical modulators may be used. Further, though the liquid crystal panel is used as an optical modulator, the arrangement is not limited thereto. Specifically, an optical modulator other than a liquid crystal panel such as a device using a micro mirror may be used. A reflection-type optical modulator may be used instead of a transmission-type optical modulator.

Specific structure and shape of the components in implementing the present invention may be designed in any manner.

INDUSTRIAL AVAILABILITY

As described above, the projection lens manufacturing apparatus and the projection lens manufacturing method of the present invention are preferably used as a manufacturing apparatus and a manufacturing method for producing a projection lens used in a projector. Especially, the apparatus and the methods are suitable for manufacturing a projection lens which is capable of reducing cost, size, and weight by reducing the number of components of the projector, adjusting position of optical axes of a plurality of lenses of the projection lens with high accuracy, and projecting high-quality image irrespective of the material of the lens.

What is claimed is:

1. A projection lens manufacturing apparatus for manufacturing a projection lens, the projection lens including a lens-holding barrel with a predetermined optical path being set thereinside and a plurality of lenses sequentially arranged on an illuminating optical axis of the optical path, a pair of position-adjusting holes formed respectively on two axes orthogonal to each other to adjust the position of at least one of the plurality of lenses along the two axes on a plane orthogonal to the illuminating optical axis, the apparatus comprising:

a light source that irradiates an adjustment light beam;

a projection lens holding mechanism that holds a lens to be manufactured at a lens-holding position to adjust the position of the lens to be adjusted on the illuminating optical axis;

an image light irradiation mechanism forming an image light including a predetermined test pattern in accordance with the light beam irradiated by the light source and introducing the image light into the projection lens located at the lens-adjusting position;

two lens position adjusters that respectively adjust the position of the lens to be adjusted along the two axes through the lens position-adjusting holes while detecting the image light projected by the projection lens into which the image light is introduced; and a bonding mechanism that bonds the position-adjusted lens to the lens-holding barrel.

2. The projection lens manufacturing apparatus according to claim 1, the lens position adjusters comprising:

first and a second pins that are respectively inserted into the pair of the position-adjusting holes and abut to the outer circumference of the lens to be adjusted;

a biasing portion that biases the first and the second pins toward each other; and an advancement/retraction portion that advances and retracts the first pin relative to the second pin and retracts and advances the second pin in accordance with the advancement and retraction of the first pin.

3. The projection lens manufacturing apparatus according to claim 2, the biasing portion being a cylinder device provided for each of the pin that biases the pins by fluid pressure.

4. The projection lens manufacturing apparatus according to claim 2, the advancement/retraction portion being a micrometer head that advances and retracts the first pin relative to the second pin.

5. The projection lens manufacturing apparatus according to claim 1, further comprising a drive mechanism that moves the projection lens holding mechanism from a position where the lens position adjusters are located at a position where a projection lens to be manufactured is supplied.

6. The projection lens manufacturing apparatus according to claim 5, the drive mechanism comprising:

a rotary drive mechanism that rotates the projection lens holding mechanism around a base end of an arm connected to the projection lens holding mechanism on a plane orthogonal to the illuminating optical axis and moves the projection lens holding mechanism between a position on the illumination optical axis and a position off the illuminating optical axis.

7. The projection lens manufacturing apparatus according to claim 1, an adhesive injection hole, for injecting an adhesive for bonding the position-adjusted lens after adjusting the position thereof, being formed on the lens holding barrel, the bonding mechanism comprising a light beam irradiator that cures a photo-curing adhesive injected into the adhesive injection hole.

8. The projection lens manufacturing apparatus according to claim 7, the bonding mechanism comprising:

an adhesive-injecting portion that injects the photo-curing adhesive into the adhesive injection hole.

9. The projection lens manufacturing apparatus according to claim 7, further comprising:

a light-shielding mechanism provided on the optical path between the light source and the projection lens, the light-shielding mechanism blocking the light beam irradiated by the light source from being introduced into the projection lens.

10. The projection lens manufacturing apparatus according to claim 1, a screen on which the image light being projected through the projection lens is located on the downstream of the optical path of the projection lens.

11. The projection lens manufacturing apparatus according to claim 1, the optical path from the light source to the projection lens being arranged approximately along a vertical direction.

12. The projection lens manufacturing apparatus according to claim 11, a reflection member that reflects to bend the optical path of the image light irradiated by the projection lens and a screen on which the reflected image light being projected are provided on the downstream of the optical path of the projection lens.

13. A projection lens manufacturing method for manufacturing a projection lens including a lens holding barrel in which an optical path is set, a plurality of lenses sequentially disposed on an illuminating optical axis of the optical path, and a pair of position-adjusting holes formed on the lens holding barrel, the position-adjusting holes being used for adjusting the position of at least one of the plurality of the lenses in a direction along mutually orthogonal two axes on a plane orthogonal to the illuminating optical axis, the method comprising:

holding the projection lens to be adjusted at a lens adjusting position for adjusting the position of the lens to be adjusted on the illuminating optical axis;

irradiating an adjustment light beam by a light source;

generating an image light including a predetermined test pattern in accordance with the light beam irradiated by the light source and introducing the image light into the projection lens located on the illuminating optical axis;

adjusting the positions of the respective lenses to be adjusted along the two axes through the position adjusting hole while detecting the image light irradiated by the projection lens into which the image light is introduced; and bonding the lens with the position thereof being adjusted on the lens holding barrel.

14. A projection lens manufactured by the projection lens manufacturing method according to claim 13.

15. A projector, comprising
the projection lens according to claim 14.

* * * * *